US011823922B2

(12) United States Patent
Kiyotomi et al.

(10) Patent No.: US 11,823,922 B2
(45) Date of Patent: Nov. 21, 2023

(54) SUBSTRATE INSPECTION APPARATUS, SUBSTRATE PROCESSING APPARATUS, SUBSTRATE INSPECTION METHOD, AND COMPUTER-READABLE RECORDING MEDIUM

(71) Applicant: Tokyo Electron Limited, Tokyo (JP)

(72) Inventors: Akiko Kiyotomi, Kumamoto (JP); Masato Hosaka, Kumamoto (JP); Tadashi Nishiyama, Kumamoto (JP); Kazuya Hisano, Kumamoto (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 18/110,419

(22) Filed: Feb. 16, 2023

(65) Prior Publication Data

US 2023/0197480 A1 Jun. 22, 2023

Related U.S. Application Data

(63) Continuation of application No. 16/804,159, filed on Feb. 28, 2020, now Pat. No. 11,609,502.

(30) Foreign Application Priority Data

Mar. 4, 2019 (JP) ................................ 2019-038414
Nov. 12, 2019 (JP) ................................ 2019-204944

(51) Int. Cl.
*H01L 21/67* (2006.01)
*G06V 10/44* (2022.01)
(Continued)

(52) U.S. Cl.
CPC ...... *H01L 21/67178* (2013.01); *G03F 7/7065* (2013.01); *G06Q 20/08* (2013.01);
(Continued)

(58) Field of Classification Search
CPC ......... H01L 21/67178; H01L 21/67259; H01L 22/12; H01L 22/30; H01L 21/6715;
(Continued)

(56) References Cited

U.S. PATENT DOCUMENTS

2002/0127485 A1* 9/2002 Hong .................... G03F 7/2026 430/30
2004/0090639 A1* 5/2004 Kubo ..................... G01B 21/30 257/E21.525

(Continued)

FOREIGN PATENT DOCUMENTS

JP 2006-300775 A1 11/2006
JP 2012-216754 A1 11/2012

(Continued)

*Primary Examiner* — Tuyen K Vo
(74) *Attorney, Agent, or Firm* — Venjuris, P.C.

(57) ABSTRACT

A substrate inspection apparatus includes: a storage configured to store inspection image data obtained from a captured image of a periphery of a substrate on which a film is formed, and an inspection recipe; an edge detector configured to detect a target edge as an edge of an inspection target film on the basis of the inspection image data stored in the storage by using the inspection recipe stored in the storage; a periphery calculator configured to calculate a position of a theoretical periphery of the substrate; and a width calculator configured to calculate a width between the theoretical periphery of the substrate and the target edge on the basis of position data of the theoretical periphery of the substrate obtained by the periphery calculator and position data of the target edge obtained by the edge detector.

10 Claims, 28 Drawing Sheets

SUBSTRATE PROCESSING SYSTEM 1
CONTROLLER 10
OPERATION COMMAND HOLDER 111
FILM FORMATION CONTROLLER 112
UNIT U1
EDGE POSITION ADJUSTOR 113
SUBSTRATE INSPECTION UNIT 100A
OUTPUT UNIT 108
DETERMINATION UNIT 107
WIDTH CALCULATOR 142
EDGE CORRECTOR 106
PERIPHERY CALCULATOR 141
EDGE DETECTOR 105
STORAGE 102
IMAGE DATA ACQUISITION UNIT 104
UNIT U3
READER 101
INPUT INFORMATION ACQUISITION UNIT 103
OPERATION UNIT 19
RM

(51) Int. Cl.
*G03F 7/00* (2006.01)
*G06V 10/98* (2022.01)
*G06Q 20/08* (2012.01)
*G06Q 20/22* (2012.01)

(52) U.S. Cl.
CPC ............. *G06Q 20/22* (2013.01); *G06V 10/44* (2022.01); *G06V 10/98* (2022.01); *H01L 21/67259* (2013.01)

(58) Field of Classification Search
CPC .... H01L 21/67288; G03F 7/7065; G03F 7/11; G03F 7/16; G03F 7/30; G03F 7/70483; G06Q 20/08; G06Q 20/22; G06V 10/44; G06V 10/98; G06V 2201/06; G06T 7/0004; G06T 2207/30148
See application file for complete search history.

(56) References Cited

U.S. PATENT DOCUMENTS

2008/0007727 A1* 1/2008 Okawa ............... G01N 21/9503 356/237.2
2009/0257058 A1* 10/2009 Urano ................ G01N 21/9503 356/237.2
2010/0158345 A1* 6/2010 Kitamura .................. G06T 7/13 382/145
2010/0215247 A1 8/2010 Kitamura et al.
2011/0263049 A1* 10/2011 Voges ................ G01N 21/9503 257/E21.53
2013/0304399 A1* 11/2013 Chen .................... G01N 21/956 702/40
2013/0343632 A1* 12/2013 Urano ..................... G06T 7/001 382/149
2015/0212019 A1* 7/2015 Shishido ............... G03F 7/7065 250/307
2016/0246187 A1 8/2016 Tomita
2019/0019868 A1* 1/2019 Wada ................ H01L 21/02378
2019/0304826 A1* 10/2019 Liu .................... G01N 21/9505
2020/0185258 A1* 6/2020 Endo ..................... H01L 21/681
2020/0264111 A1* 8/2020 Chou ................. G01N 21/9503

FOREIGN PATENT DOCUMENTS

JP 2016-161474 A1 9/2016
JP 2017-152443 A 8/2017

* cited by examiner 1
2
3
4
5
6
12
13
13a
13a
16
A1
A4
A7
A8
U1(U16)
U2(U26)
U3
U10
U11
W
W
11
11a
10
CONTROLLER
100
19

SUBSTRATE INSPECTION APPARATUS, SUBSTRATE PROCESSING APPARATUS, SUBSTRATE INSPECTION METHOD, AND COMPUTER-READABLE RECORDING MEDIUM

CROSS-REFERENCE TO RELATED APPLICATIONS

This application is a continuation application of U.S. patent application Ser. No. 16/804,159, filed on Feb. 28, 2020, which claims priority from Japanese Patent Application Nos. 2019-038414 and 2019-204944 filed on Mar. 4, 2019 and Nov. 12, 2019, respectively, with the Japan Patent Office, all of which are incorporated herein in their entireties by reference.

TECHNICAL FIELD

The present disclosure relates to a substrate inspection apparatus, a substrate processing apparatus, a substrate inspection method, and a computer-readable recording medium.

BACKGROUND

Japanese Patent Laid-Open Publication No. 2017-152443 discloses a substrate imaging device that includes a rotation holder that holds and rotates a substrate, a mirror member having a reflective surface that faces the end surface of the substrate held by the rotation holder and the peripheral region of the back surface, and a camera having an image sensor. In the substrate imaging device, both light from the peripheral region of the front surface of the substrate, and light reflected from the reflective surface after coming from the end surface of the substrate are input to the image sensor of the camera via a lens. Accordingly, it is possible to simultaneously image both the peripheral region of the front surface of the substrate and the end surface of the substrate by one camera. Captured image data imaged by the substrate imaging device may be used for inspecting, for example, the state of an edge of a film formed on the front surface of the substrate.

SUMMARY

A substrate inspection apparatus according to one aspect of the present disclosure includes: a storage configured to store inspection image data obtained from a captured image of a periphery of a substrate on which a plurality of films is formed, and an inspection recipe; and an edge detector configured to detect a target edge as an edge of an inspection target film among the films on the basis of the inspection image data stored in the storage by using the inspection recipe stored in the storage. Each of edges of the films extends along the periphery of the substrate. The inspection recipe is configured by combining parameters each of which has one option specified among a plurality of options.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF EMBODIMENT

Figure 1:
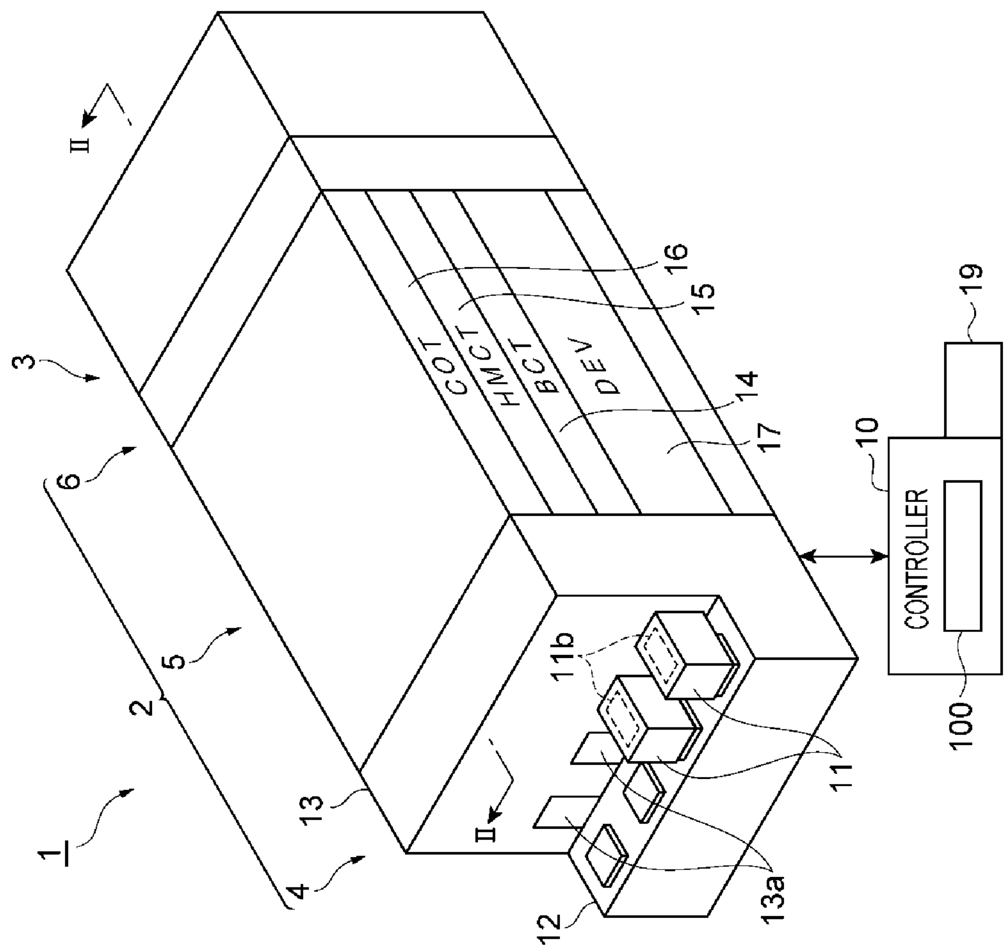
FIG. 1 is a perspective view illustrating an example of a substrate processing system.

In the following detailed description, reference is made to the accompanying drawings, which form a part hereof. The illustrative embodiments described in the detailed description, drawing, and claims are not meant to be limiting. Other embodiments may be utilized, and other changes may be made without departing from the spirit or scope of the subject matter presented here.

In the following descriptions, the same reference numerals will be used for the same elements or elements having the same functions, and redundant descriptions will be omitted.

[Substrate Processing System]

As illustrated in FIG. 1, a substrate processing system 1 (a substrate processing apparatus) includes a coating developing device 2, an exposure device 3, a controller 10 (a controller), and an operation unit 19.

The exposure device 3 is configured to perform an exposure processing (pattern exposure) on a resist film formed on the front surface Wa (see FIG. 5) of a wafer W (a substrate). Specifically, the exposure device 3 selectively irradiates an exposure target portion of a photosensitive resist film (a photosensitive film) with energy rays by a method such as, for example, immersion exposure. As for the energy rays, for example, an ArF excimer laser, a KrF excimer laser, a g-line, an i-line, or an extreme ultraviolet (EUV) may be exemplified.

The coating developing device 2 performs a processing of forming the resist film on the front surface Wa of the wafer W before the exposure processing by the exposure device 3, and performs a development processing of the resist film after the exposure processing. The wafer W may take a disc shape, a circular shape which is partially cut out, or a shape other than a circle such as, for example, a polygon. Hereinafter, a case where the wafer W takes a disc shape will be described as an example. The wafer W may be, for example, a semiconductor substrate, a glass substrate, a mask substrate, a flat panel display (FPD) substrate, or other various substrates. The diameter of the wafer W may range from about, for example, 200 mm to 450 mm. When a bevel (chamfer) exists at the edge of the wafer W, the "front surface" in this specification also includes a bevel portion as viewed from the front surface Wa side of the wafer W. Similarly, the "back surface" in this specification also includes a bevel portion as viewed from the back surface Wb (see e.g. FIG. 5) side of the wafer W. The "end surface" in this specification also includes a bevel portion as viewed from the end surface We (see e.g. FIG. 5) side of the wafer W.

As illustrated in FIGS. 1 to 4, the coating developing device 2 includes a carrier block 4, a processing block 5, and an interface block 6. The carrier block 4, the processing block 5, and the interface block 6 are arranged in the horizontal direction.

Figure 3:
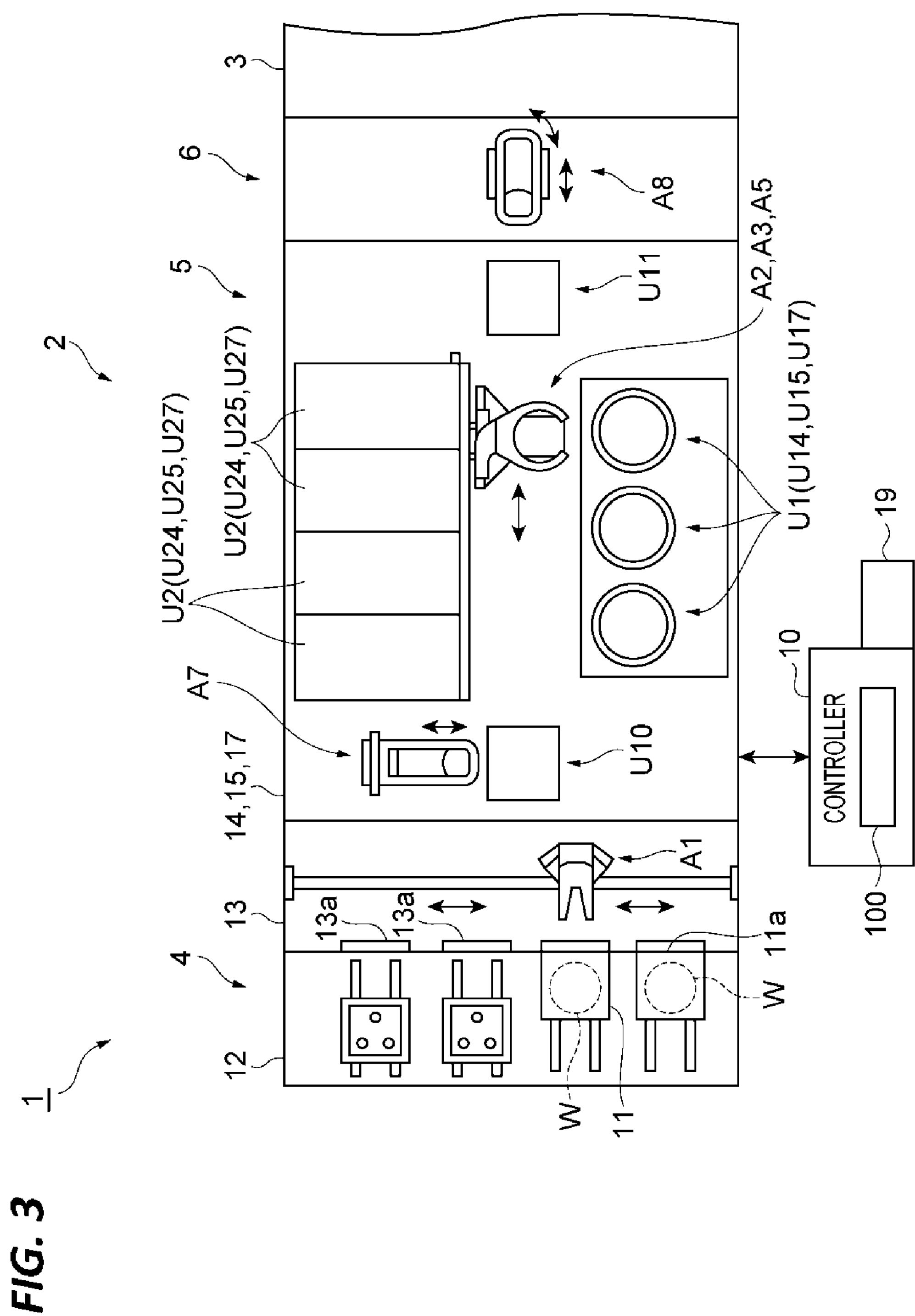
FIG. 3 is a top view illustrating an example of a processing module (a BCT module, an HMCT module, and a DEV module).
Figure 4:
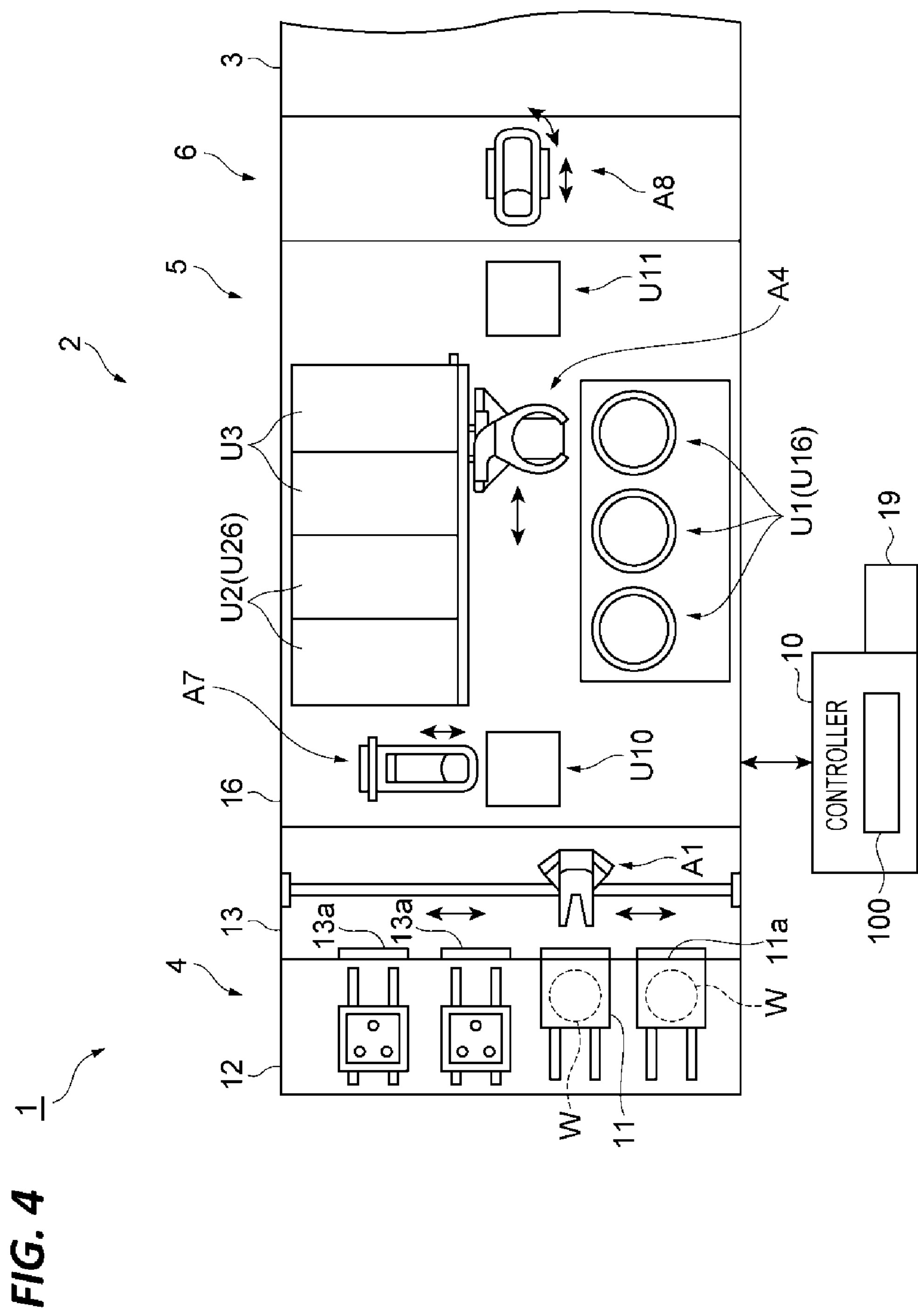
FIG. 4 is a top view illustrating an example of a processing module (a COT module).

As illustrated in FIGS. 1, 3 and 4, the carrier block 4 includes a carrier station 12, and a carry-in/out section 13. The carrier station 12 supports a plurality of carriers 11. The carrier 11 accommodates at least one wafer W in a sealed state. An open/close door (not illustrated) through which the wafer W is loaded/unloaded is provided on a side surface 11*a* of the carrier 11. The carrier 11 is detachably provided on the carrier station 12 such that the side surface 11*a* faces the carry-in/out section 13 side.

The carry-in/out section 13 is located between the carrier station 12 and the processing block 5. The carry-in/out section 13 includes a plurality of open/close doors 13*a*. When the carrier 11 is placed on the carrier station 12, a state is made where the open/close door of the carrier 11 faces the open/close door 13*a*. By opening the open/close door 13*a* and the open/close door of the side surface 11*a* at the same time, the inside of the carrier 11 communicates with the inside of the carry-in/out section 13. The carry-in/out section 13 incorporates a transfer arm A1. The transfer arm A1 is configured to take the wafer W out of the carrier 11 and deliver the wafer W to the processing block 5, and receive the wafer W from the processing block 5 and return the wafer W into the carrier 11.

As illustrated in FIGS. 1 to 4, the processing block 5 includes processing modules 14 to 17. These processing modules are arranged in the order of the processing module 17, the processing module 14, the processing module 15, and the processing module 16, from the floor surface side.

Figure 2:
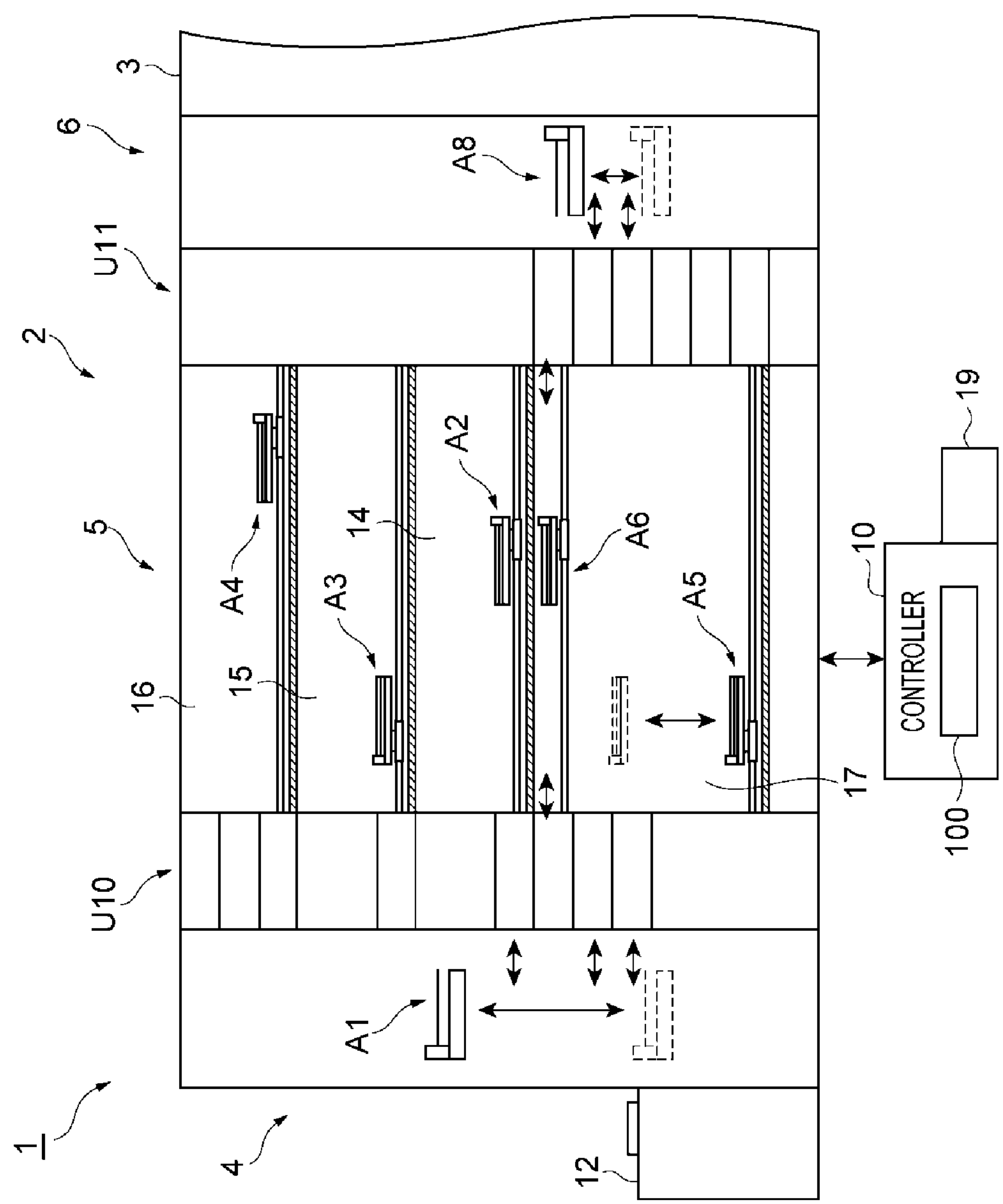
FIG. 2 is a sectional view taken along the II-II line illustrated in FIG. 1.

The processing module 14 is configured to form an underlayer film on the front surface Wa of the wafer W, and is also called a BCT module. As illustrated in FIGS. 2 and 3, the processing module 14 incorporates a plurality of liquid processing units U1, a plurality of heat treatment units U2, and a transfer arm A2 that transfers the wafers W to these units U1 and U2. The unit U1 (hereinafter, referred to as a "unit U14" in some cases) of the processing module 14 is configured to apply a coating liquid for forming an underlayer film to the front surface Wa of the wafer W to form a coating film. The unit U14 is configured to remove the peripheral portion of the coating film formed on the front surface Wa of the wafer W.

The unit U2 (hereinafter, referred to as a "unit U24" in some cases) of the processing module 14 is configured to perform a heat treatment by heating the wafer W by, for example, a hot plate, and cooling the heated wafer W by, for example, a cooling plate. As for a specific example of the heat treatment performed in the processing module 14, a bake treatment for curing the coating film to form the underlayer film may be exemplified. As for the underlayer film, for example, an anti-reflection (SiARC) film may be exemplified. In this specification, in the processing module 14, the coating film formed on the front surface Wa of the wafer W, the coating film (the underlayer film before the heat treatment) from which the peripheral portion has been removed, and the underlayer film after the heat treatment will be collectively referred to as a "film R1."

The processing module 15 is configured to form an intermediate film (hard mask) on the underlayer film, and is also called an HMCT module. As illustrated in FIGS. 2 and 3, the processing module 15 incorporates a plurality of liquid processing units U1, a plurality of heat treatment units U2, and a transfer arm A3 that transfers the wafers W to these units U1 and U2. The unit U1 (hereinafter, referred to as a "unit U15" in some cases) of the processing module 15 is configured to apply a coating liquid for forming an intermediate film to the underlayer film of the wafer W to form a coating film. The unit U15 is configured to remove the peripheral portion of the coating film formed on the underlayer film (the film R1).

The unit U2 (hereinafter, referred to as a "unit U25" in some cases) of the processing module 15 is configured to perform a heat treatment by heating the wafer W by, for example, a hot plate, and cooling the heated wafer W by, for example, a cooling plate. As for a specific example of the heat treatment performed in the processing module 15, a bake treatment for curing the coating film to form the intermediate film may be exemplified. As for the intermediate film, for example, a spin on carbon (SOC) film, and an amorphous carbon film may be exemplified. In this specification, in the processing module 15, the coating film formed on the film R1, the coating film (the intermediate film before the heat treatment) from which the peripheral portion has been removed, and the intermediate film after the heat treatment will be collectively referred to as a "film R2."

The processing module 16 is configured to form a thermosetting and photosensitive resist film on the intermediate film, and is also called a COT module. As illustrated in FIGS. 2 and 4, the processing module 16 incorporates a plurality of liquid processing units U1, a plurality of heat treatment units U2, a plurality of imaging units U3, and a transfer arm A4 that transfers the wafers W to these units U1, U2, and U3. The unit U1 (hereinafter, referred to as a "unit U16" in some cases) of the processing module 16 is configured to apply a coating liquid (resist liquid) for forming a resist film to the intermediate film to form a coating film. The unit U16 is configured to remove the peripheral portion of the coating film formed on the intermediate film (the film R2).

The unit U2 (hereinafter, referred to as a "unit U26" in some cases) of the processing module 16 performs various heat treatments involved in the formation of the resist film. As for a specific example of the heat treatment, a pre-applied bake (PAB) treatment for curing the coating film to form the resist film may be exemplified. The imaging unit U3 images the wafer W and generates a captured image in order to inspect the wafer W. In this specification, in the processing module 16, the coating film formed on the film R2, the coating film (the resist film before the heat treatment) from which the peripheral portion has been removed, and the resist film after the heat treatment will be collectively referred to as a "film R3."

The processing module 17 is configured to perform a development processing on an exposed resist film, and is also called a DEV module. As illustrated in FIGS. 2 and 3, the processing module 17 incorporates a plurality of liquid processing units U1, a plurality of heat treatment units U2, a transfer arm A5 that transfers the wafers W to these units U1 and U2, and a transfer arm A6 that directly transfers the wafers W between shelf units U11 and U10 (to be described below) without passing through these units U1 and U2. The unit U1 (hereinafter, referred to as a "unit U17" in some cases) of the processing module 17 is configured to develop (partially remove) the exposed resist film to form a resist pattern.

The unit U2 (hereinafter, referred to as a "unit U27" in some cases) of the processing module 17 is configured to perform a heat treatment by heating the wafer W by, for example, a hot plate, and cooling the heated wafer W by, for example, a cooling plate. As for a specific example of the heat treatment performed in the processing module 17, a bake treatment (PEB: post exposure bake) before a development processing, and a bake treatment (PB: post bake) after a development processing may be exemplified.

As illustrated in FIGS. 2 and 3, the shelf unit U10 is provided on the carrier block 4 side within the processing block 5. The shelf unit U10 is provided from the floor surface to the processing module 16, and is partitioned into a plurality of cells arranged in the vertical direction. A transfer arm A7 is provided in the vicinity of the shelf unit U10. The transfer arm A7 raises and lowers the wafer W between the cells of the shelf unit U10.

The shelf unit U11 is provided on the interface block 6 side within the processing block 5. The shelf unit U11 is provided from the floor surface to the top portion of the processing module 17, and is partitioned into a plurality of cells arranged in the vertical direction.

The interface block 6 incorporates a transfer arm A8, and is connected to the exposure device 3. The transfer arm A8 is configured to take the wafer W out of the shelf unit U1*l* and deliver the wafer W to the exposure device 3, and receive the wafer W from the exposure device 3 and return the wafer W to the shelf unit U11.

The controller 10 partially or wholly controls the substrate processing system 1. Details of the controller 10 will be described below.

The operation unit 19 is an input device that accepts an operation by an operator. For example, the operation unit 19 may include a mouse, a keyboard, and a display device that displays an operation screen for operations. Each element of the operation unit 19 is connected to the controller 10 in a communication available manner One computer device may be constituted by the operation unit 19 and the controller 10. The operation unit 19 outputs input information indicating the contents of an operation by an operator, to the controller 10.

[Configuration of Liquid Processing Unit]

Figure 5:
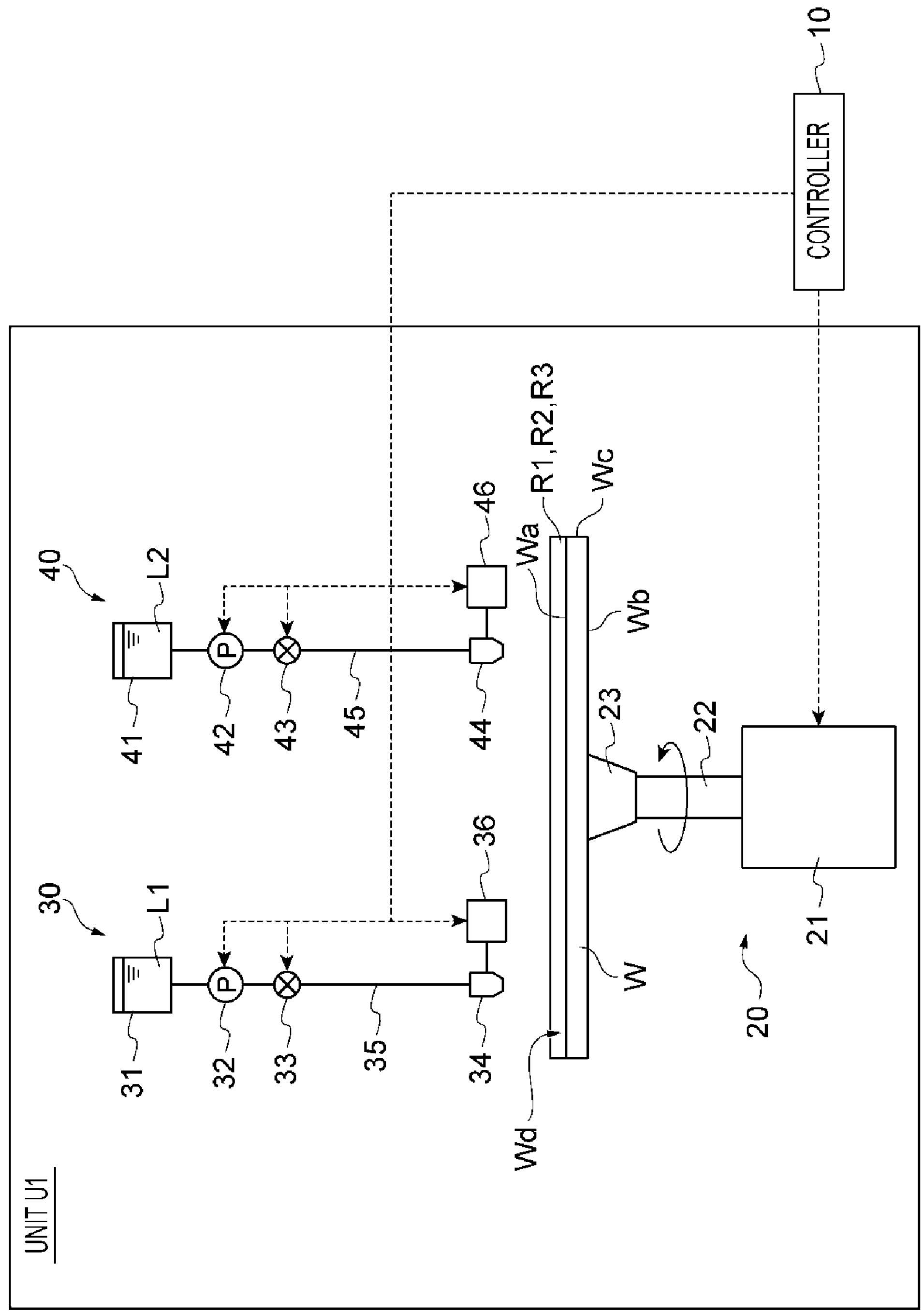
FIG. 5 is a schematic view illustrating an example of a liquid processing unit.

Subsequently, the liquid processing unit U1 will be described in more detail with reference to FIG. 5. As illustrated in FIG. 5, the unit U1 includes a rotation holder 20, a liquid supply 30, and a liquid supply 40.

The rotation holder 20 includes a rotation unit 21, a shaft 22, and a holder 23. The rotation unit 21 operates on the basis of an operation signal from the controller 10 so as to rotate the shaft 22. The rotation unit 21 is a power source such as, for example, an electric motor. The holder 23 is provided on a distal end portion of the shaft 22. The wafer W is disposed on the holder 23. The holder 23 substantially horizontally holds the wafer W by, for example, attraction. That is, the rotation holder 20 rotates the wafer W around a central axis (a rotation axis) perpendicular to the front surface Wa of the wafer W in a state where the posture of the wafer W is substantially horizontal. In the example illustrated in FIG. 5, the rotation holder 20 rotates the wafer W in the counterclockwise direction at a predetermined rotation speed when viewed from above.

The liquid supply 30 is configured to supply a processing liquid L1 to the front surface Wa of the wafer W. In the processing module 14, the processing liquid L1 is a coating liquid for forming the film RE In the processing module 15, the processing liquid L1 is a coating liquid for forming the film R2. In the processing module 16, the processing liquid L1 is a resist liquid for forming the film R3 (the resist film). In the processing module 17, the processing liquid L1 is a developer. A resist material contained in the resist liquid may be a positive-type resist material or a negative-type resist material. The positive-type resist material is a resist material in which an exposed portion of a pattern is dissolved and an unexposed portion (light-shielding portion) of the pattern remains. The negative-type resist material is a resist material in which an unexposed portion (light-shielding portion) of a pattern is dissolved and an exposed portion of the pattern remains.

The liquid supply 30 includes a liquid source 31, a pump 32, a valve 33, a nozzle 34, a pipe 35, and a driving mechanism 36. The liquid source 31 functions as a supply source of the processing liquid L1. The pump 32 operates on the basis of an operation signal from the controller 10, sucks the processing liquid L1 from the liquid source 31, and sends the processing liquid L1 to the nozzle 34 via the pipe 35 and the valve 33.

The nozzle 34 is disposed above the wafer W such that an ejection port faces the front surface Wa of the wafer W. The nozzle 34 is capable of ejecting the processing liquid L1 sent from the pump 32, to the front surface Wa of the wafer W. The pipe 35 is connected to the liquid source 31, the pump 32, the valve 33, and the nozzle 34 in this order from the upstream side. The driving mechanism 36 operates on the basis of an operation signal from the controller 10, and is configured to move the nozzle 34 in the horizontal direction and the vertical direction.

The liquid supply 40 is configured to supply a processing liquid L2 to the front surface Wa of the wafer W. In the processing module 14, the processing liquid L2 is a chemical liquid (for example, an organic solvent) for removing the peripheral portion of the film RE In the processing module 15, the processing liquid L2 is a chemical liquid (for example, an organic solvent) for removing the peripheral portion of the film R2. In the processing module 16, the processing liquid L2 is a chemical liquid (for example, an organic solvent) for removing the peripheral portion of the film R3. In the processing module 17, the processing liquid L2 is a rinsing liquid.

The liquid supply 40 includes a liquid source 41, a pump 42, a valve 43, a nozzle 44, a pipe 45, and a driving mechanism 46. The liquid source 41 functions as a supply source of the processing liquid L2. The pump 42 sucks the processing liquid L2 from the liquid source 41, and sends the processing liquid L2 to the nozzle 44 via the pipe 45 and the valve 43.

The nozzle 44 is disposed above the wafer W such that an ejection port faces the front surface Wa of the wafer W. The nozzle 44 is capable of ejecting the processing liquid L2 sent from the pump 42, to the front surface Wa of the wafer W. The pipe 45 is connected to the liquid source 41, the pump 42, the valve 43, and the nozzle 44 in this order from the upstream side. The driving mechanism 46 operates on the basis of an operation signal from the controller 10, and is configured to move the nozzle 44 in the horizontal direction and the vertical direction.

In the processing modules 14 to 17, the driving mechanism 46 may move the nozzle 44 along the radial direction of the wafer W that is substantially horizontally held, for example, when viewed from above. As the nozzle 44 moves along the radial direction of the wafer W by the driving mechanism 46, the relative position between the nozzle 44 and the wafer W changes. As the nozzle 44 moves with respect to the wafer W, the position (adhering position) at which the processing liquid L2 ejected from the nozzle 44 is supplied to the front surface Wa may be changed. In particular, in the processing modules 14 to 16, when the adhering position is changed, the width of the peripheral portion of each film removed by the processing liquid L2 (a linear distance between the periphery of the wafer W and the edge of each film) varies according to the adhering position. That is, the position of the edge of each film may be changed according to the relative position of the nozzle 44 with respect to the wafer W when the peripheral portion of each film is removed.

[Configuration of Imaging Unit]

Figure 6:
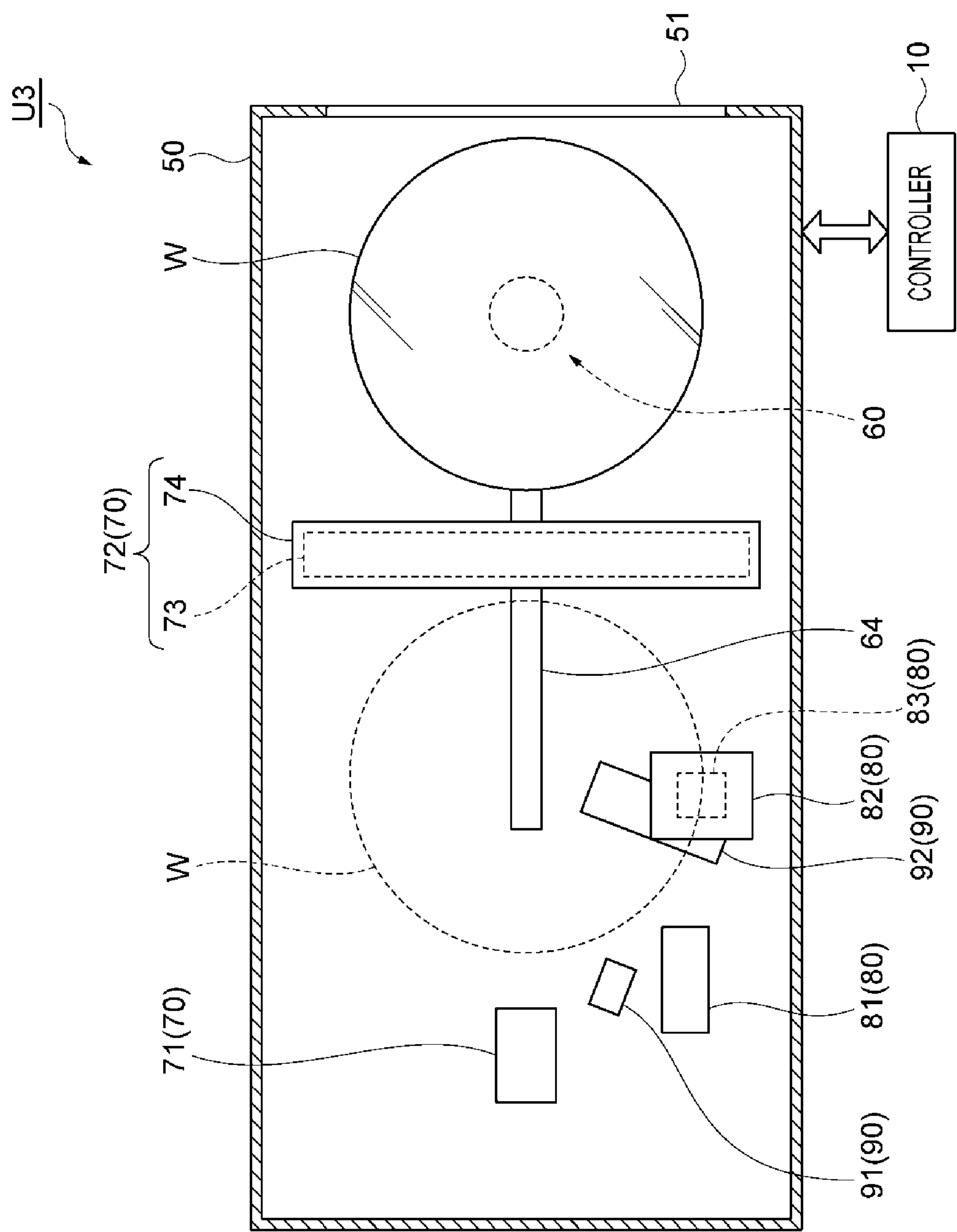
FIG. 6 is a schematic view illustrating an example of a configuration of an imaging unit when viewed from above.
Figure 7:
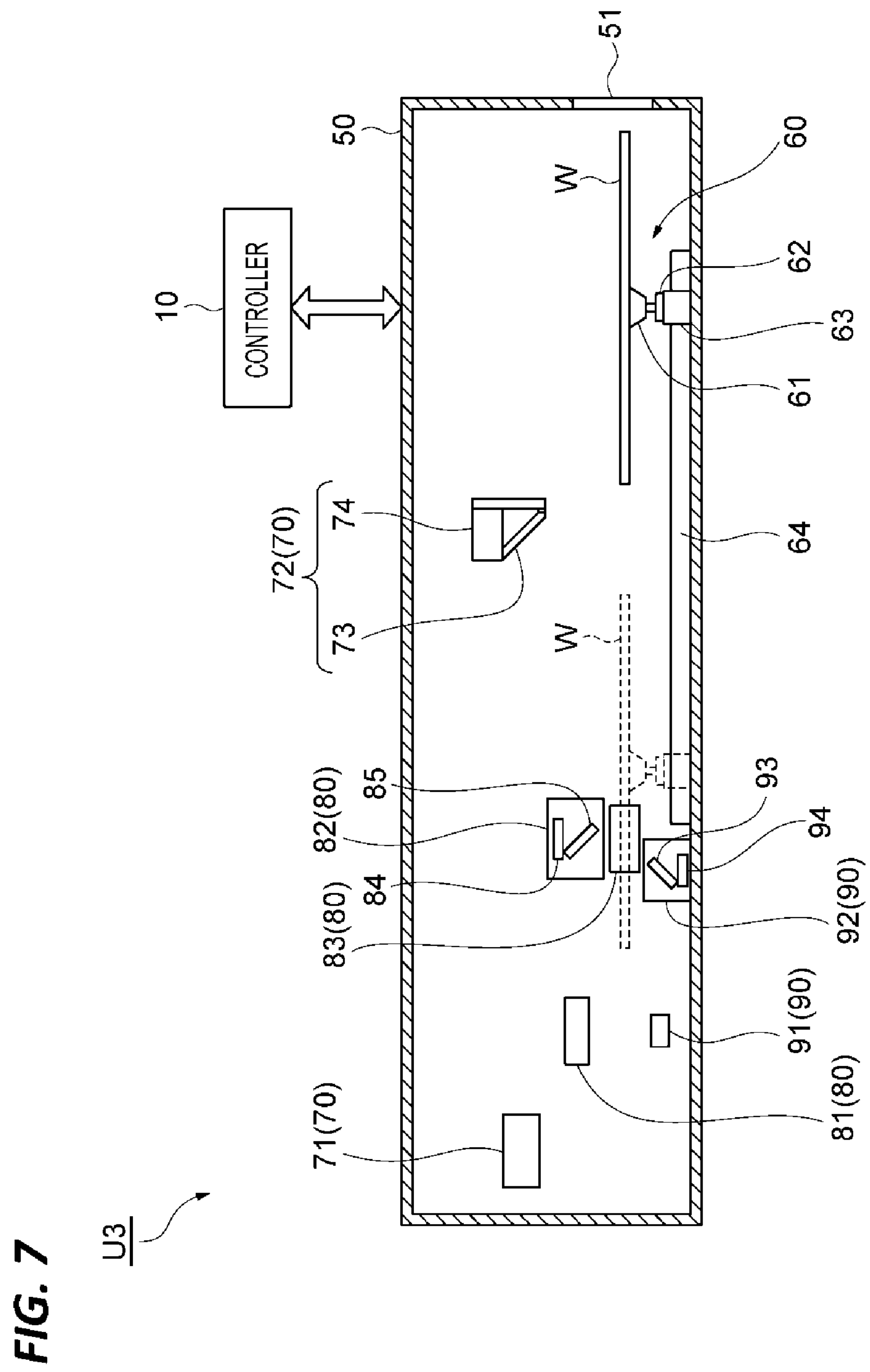
FIG. 7 is a schematic view illustrating an example of a configuration of the imaging unit when viewed from side.

Subsequently, the imaging unit U3 will be described in more detail with reference to FIGS. 6 and 7. As illustrated in FIGS. 6 and 7, the unit U3 includes a casing 50, a rotation holding subunit 60, a front surface imaging subunit 70, a periphery imaging subunit 80, and a back surface imaging subunit 90. These subunits are disposed within the casing 50. A loading/unloading port 51 through which the wafer W is loaded into the casing 50 and is unloaded to the outside of the casing 50 is formed at one end wall of the casing 50.

The rotation holding subunit 60 includes a holder 61, actuators 62 and 63, and a guide rail 64. The holder 61 is, for example, an attraction chuck that substantially horizontally holds the wafer W by, for example, attraction.

The actuator 62 is, for example, an electric motor, and rotationally drives the holder 61. That is, the actuator 62 rotates the wafer W held by the holder 61. The actuator 62 may include an encoder for detecting the rotational position of the holder 61. In this case, it is possible to associate the rotational position with the position of each surface of the wafer W imaged by each imaging subunit. When the wafer W has a notch, it is possible to specify the posture of the wafer W on the basis of the notch determined by each imaging subunit and the rotational position detected by the encoder. The rotational position of the holder 61 is a rotation angle of the holder 61.

The actuator 63 is, for example, a linear actuator, and moves the holder 61 along the guide rail 64. That is, the actuator 63 transfers the wafer W held by the holder 61 between one end side and the other end side of the guide rail 64. Accordingly, the wafer W held by the holder 61 is movable between the first position near the loading/unloading port 51, and the second position near the periphery imaging subunit 80 and the back surface imaging subunit 90. The guide rail 64 extends linearly (for example, a linear form) within the casing 50.

The front surface imaging subunit 70 includes a camera 71, and a lighting module 72. The camera 71 includes a lens, and one image sensor (for example, a CCD image sensor, or a CMOS image sensor). The camera 71 faces the lighting module 72.

The lighting module 72 includes a half mirror 73, and a light source 74. The half mirror 73 is disposed within the casing 50 in a state where the half mirror 73 is inclined by approximately 45° with respect to the horizontal direction. The half mirror 73 is located above the middle portion of the guide rail 64 so as to intersect with the extension direction of the guide rail 64 when viewed from above. The half mirror 73 has a rectangular shape. The length of the half mirror 73 (the length in the longitudinal direction) is larger than the diameter of the wafer W.

The light source 74 is located above the half mirror 73. The light emitted from the light source 74 passes through the half mirror 73 as a whole and radiates downwards (the guide rail 64 side). The light that has passed through the half mirror 73 is reflected from an object located below the half mirror 73, reflected again by the half mirror 73, passes through the lens of the camera 71, and enters the image sensor of the camera 71. That is, the camera 71 may image the object present in an irradiation area of the light source 74 through the half mirror 73. For example, when the holder 61 that holds the wafer W moves along the guide rail 64 by the actuator 63, the camera 71 may image the front surface Wa of the wafer W that passes through the irradiation area of the light source 74. The captured image data imaged by the camera 71 is transmitted to the controller 10.

As illustrated in FIGS. 6 and 7, the periphery imaging subunit 80 includes a camera 81, and a lighting module 82, and a mirror member 83. The camera 81 includes a lens, one image sensor (for example, a CCD image sensor, or a CMOS image sensor). The camera 81 faces the lighting module 82.

As illustrated in FIGS. 6 and 7, the lighting module 82 is disposed above the wafer W held by the holder 61. The lighting module 82 includes a light source 84, and a half mirror 85. As illustrated in FIG. 7, the half mirror 85 is disposed in a state where the half mirror 85 is inclined by approximately 45° with respect to the horizontal direction. As illustrated in FIGS. 6 and 7, the mirror member 83 is disposed below the lighting module 82. The mirror member 83 includes a body constituted by an aluminum block, and a reflective surface.

When the wafer W held by the holder 61 is present at the second position, the reflective surface of the mirror member 83 faces the end surface Wc and the periphery Wd of the back surface Wb (see FIG. 5) of the wafer W held by the holder 61. The reflective surface of the mirror member 83 is inclined with respect to the rotation axis of the holder 61. The reflective surface of the mirror member 83 is mirror-finished. For example, a mirror sheet may be attached to the reflective surface, or the reflective surface may be subjected to aluminum plating or may be deposited with an aluminum material. The reflective surface is a curved surface that caves in towards the side away from the end surface Wc of the wafer W held by the holder 61.

In the lighting module 82, the light emitted from the light source 84 passes through the half mirror 85 as a whole and radiates downwards. The light that has passed through the half mirror 85 is reflected from the reflective surface of the mirror member 83 located below the half mirror 85. When the wafer W held by the holder 61 is present at the second position, the light reflected from the reflective surface of the mirror member 83 after passing through the half mirror 85 mainly illuminates the end surface Wc of the wafer W and the periphery Wd of the front surface Wa.

The light reflected from the periphery Wd of the front surface Wa of the wafer W directly enters the half mirror 85 without being directed toward the reflective surface of the mirror member 83. Then, the reflected light enters the image sensor of the camera 81. Meanwhile, the light reflected from the end surface Wc of the wafer W is directed toward the reflective surface of the mirror member 83. The reflected light is sequentially reflected from the reflective surface of the mirror member 83 and the half mirror 85, and enters the image sensor of the camera 81. In this manner, the light reflected from the periphery Wd of the wafer W and the light reflected from the end surface Wc of the wafer W enter the image sensor of the camera 81 through different optical paths. In this manner, both the light from the periphery Wd of the front surface Wa of the wafer W, and the light from the end surface Wc of the wafer W are input to the image sensor of the camera 81. That is, when the wafer W held by the holder 61 is present at the second position, the camera 81 is configured to image both the periphery Wd of the front surface Wa of the wafer W and the end surface Wc of the wafer W, and generate captured images of the periphery Wd of the front surface Wa and the end surface Wc. The captured image data imaged by the camera 81 is transmitted to the controller 10.

As illustrated in FIGS. 6 and 7, the back surface imaging subunit 90 includes a camera 91, and a lighting module 92. The camera 91 includes a lens, and one image sensor (for example, a CCD image sensor, or a CMOS image sensor). The camera 91 faces the lighting module 92.

The lighting module 92 is disposed below the lighting module 82, below the wafer W held by the holder 61. As illustrated in FIG. 7, the lighting module 92 includes a half mirror 93 and a light source 94. The half mirror 93 is disposed in a state where the half mirror 93 is inclined by approximately 45° with respect to the horizontal direction.

The light source 94 is located below the half mirror 93. The light emitted from the light source 94 passes through the half mirror 93 as a whole and radiates upwards. The light that has passed through the half mirror 93 is reflected from an object located above the half mirror 93, reflected again by the half mirror 93, passes through the lens of the camera 91, and enters the image sensor of the camera 91. That is, the camera 91 may image the object present in an irradiation area of the light source 94 through the half mirror 93. For example, when the wafer W held by the holder 61 is present at the second position, the camera 91 may image the periphery Wd of the back surface Wb of the wafer W. The captured image data imaged by the camera 91 is transmitted to the controller 10.

[Configuration of Controller]

Figure 8:
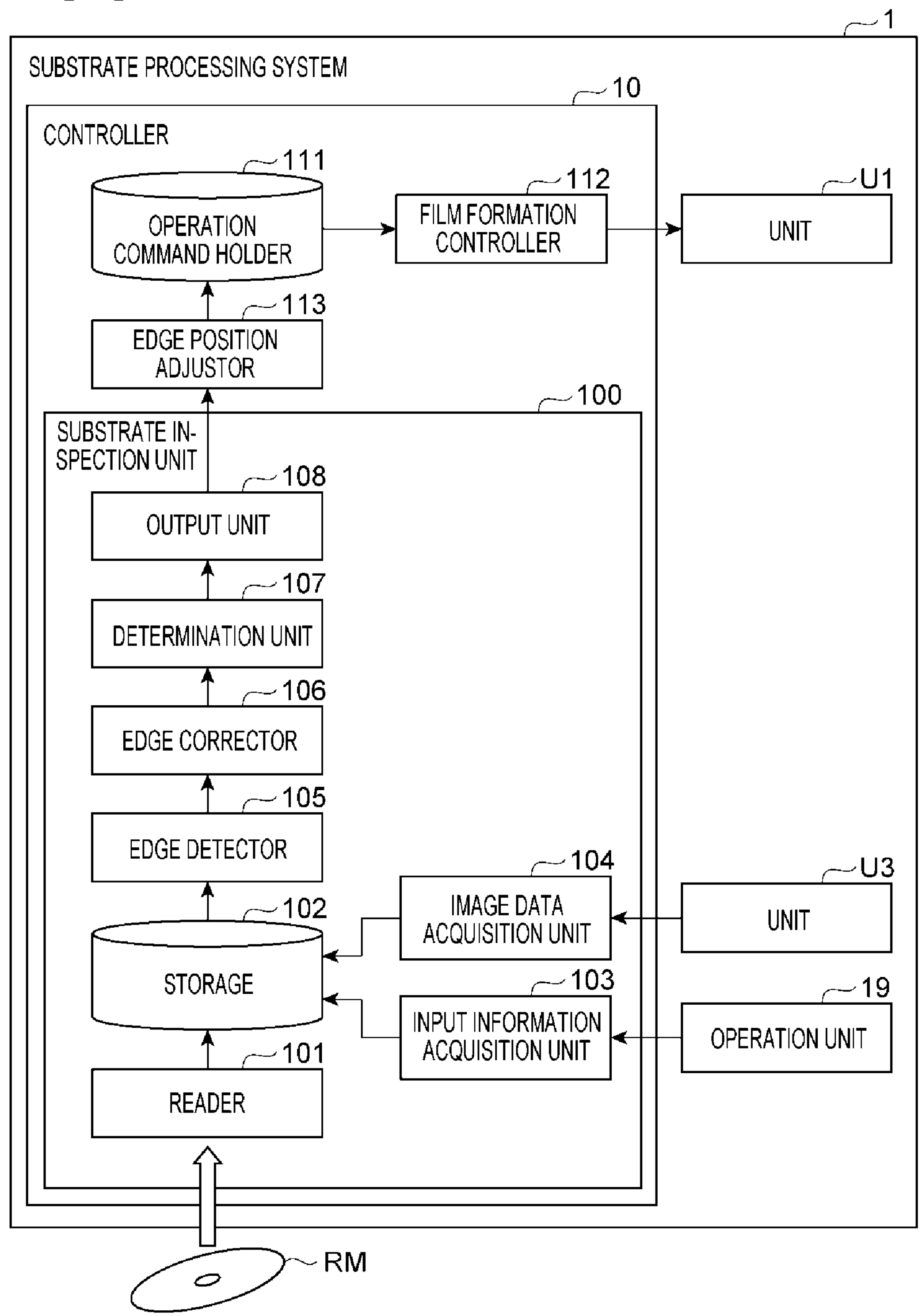
FIG. 8 is a block diagram illustrating an example of a main portion of the substrate processing system.

As illustrated in FIG. 8, the controller 10 includes, as function modules, a substrate inspection unit 100 (a substrate inspection apparatus), an operation command holder 111, a film formation controller 112, and an edge position adjustor 113. These function modules are merely a plurality of modules obtained by dividing a function of the controller 10 for the sake of convenience, and do not necessarily indicate that hardware constituting the controller 10 is divided into these modules. Each function module is not limited to one realized by execution of a program, but may be one realized by a dedicated electric circuit (for example, a logic circuit) or an integrated circuit (ASIC: application specific integrated circuit) obtained by integrating the same.

The substrate inspection unit 100 is configured to inspect the state of the edge of each of films formed on the wafer W. Specifically, the substrate inspection unit 100 is configured to detect the edge (hereinafter, referred to as a "target edge") of an inspection target film as at least one of the films on the basis of inspection image data obtained from a captured image of the periphery Wd of the wafer W, by using an inspection recipe (to be described below). Hereinafter, a case where three films (the films R1, R2, and R3) are formed on the wafer W and the edge of each of the three films is detected as a target edge will be described as an example.

The substrate inspection unit 100 includes, as function modules, a reader 101, a storage 102, an input information acquisition unit 103, an image data acquisition unit 104, an edge detector 105, an edge corrector 106, a determination unit 107, and an output unit 108.

The reader 101 has a function of reading a program from a computer-readable recording medium RM. In the recording medium RM, a program that operates each unit within the substrate processing system 1 in relation to inspection of an edge portion of a film on the wafer W is recorded. The recording medium RM may be, for example, a semiconductor memory, an optical recording disc, a magnetic recording disk, or a magneto-optical recording disk.

The storage 102 has a function of storing various data. The storage 102 stores, for example, a program read by the reader 101 from the recording medium RM, various data when an edge portion of the wafer W is inspected (the edge is detected), input information input from an operator through the operation unit 19, and various image data obtained from the imaging unit U3. The image data includes inspection image data obtained from a captured image of the periphery Wd in the front surface Wa of the wafer W. The various data when the edge is detected includes an inspection recipe that is used when the edge is detected from the inspection image data. The inspection recipe is configured according to various parameters (conditions) in extracting the edge from the inspection image data. Various parameters constituting the inspection recipe may be determined by the input information from the operator.

The input information acquisition unit 103 has a function of acquiring the input information from the operator. For example, the input information acquisition unit 103 acquires input information based on an operation of the operator, through the operation unit 19. The input information acquisition unit 103 may acquire various parameters of the inspection recipe set according to the operation of the operator, as one input information piece. The input information acquisition unit 103 outputs the acquired information input from the operator, to the storage 102.

The image data acquisition unit 104 has a function of acquiring captured image data generated by imaging each end surface of the wafer W through the unit U3. For example, the image data acquisition unit 104 may acquire at least one of captured image data obtained by imaging the periphery Wd of the front surface Wa of the wafer W, captured image data obtained by imaging the entire front surface Wa of the wafer W, and captured image data obtained by imaging the periphery Wd of the back surface Wb of the wafer W. The image data acquisition unit 104 may acquire captured color image data in which the intensity (gradation) of each of red, green and blue is defined for each pixel. For example, for each pixel of the captured color image data, the color of each pixel may be determined by defining the intensity of each color by 256 gradations. The image data acquisition unit 104 may output the acquired captured image data, as inspection image data, to the storage 102. Otherwise, the image data acquisition unit 104 may generate inspection image data by performing a predetermined processing (for example, a noise removal processing using a filter) on the captured image data, and output the inspection image data to the storage 102.

The edge detector 105 has a function of detecting a target edge from the image data stored in the storage 102. The edge detector 105 specifies (measures) the position of the target edge on the image data by using a contrast (a contrast ratio) on the image data. The edge detector 105 may detect each target edge (may measure the position of each target edge) at a plurality of measurement positions arranged along the circumferential direction of the wafer W. For example, the edge detector 105 may detect the target edge at each of 360 measurement positions obtained by changing an angle from the reference position (for example, the position of the notch) in increments of 1° in the circumferential direction. The edge detector 105 detects an inspection target edge on the basis of the inspection image data by using the inspection recipe stored in the storage 102. The edge detector 105 outputs a detection result about the target edge to the edge corrector 106.

The edge corrector 106 has a function of performing a correction processing for correcting the detection result obtained by the edge detector 105. For example, the edge corrector 106 may correct the detection result by approximating a data sequence of the target edge detected by the edge detector 105 (a plurality of measurement values at a plurality of measurement positions), and excluding an abnormal value. Specifically, the edge corrector 106 may correct the detection result by calculating a difference between a reference line calculated by smoothing the data sequence of the target edge, and each data piece included in the data sequence, and excluding a data piece whose difference is larger than a predetermined threshold from data pieces. As an example, the edge corrector 106 may calculate the reference line by calculating a moving average of the data sequence. The edge corrector 106 outputs the corrected detection result to the determination unit 107. The edge corrector 106 may output the detection result obtained by the edge detector 105, as it is, to the determination unit 107 without correcting the detection result.

The determination unit 107 determines a formation state of the edge on the basis of the detection result about the target edge. For example, the determination unit 107 may calculate a removal width in a peripheral portion of an inspection target film from the detection result of the target edge, and determine whether the calculated removal width falls within an allowable range. Otherwise, the determination unit 107 may determine whether the calculated removal width falls within a range in which the removal width needs to be adjusted. The determination unit 107 outputs the determination result to the output unit 108.

The output unit 108 has a function of outputting the determination result about the inspection target edge. The output unit 108 may output the determination result to an element other than the substrate inspection unit 100 within the controller 10, or may output the determination result to a device outside the controller 10 (for example, a display device that displays the determination result). For example, when the determination by the determination unit 107 indicates that adjustment of the removal width is required, the output unit 108 may output a calculation result of the removal width and a signal indicating that the removal width needs to be adjusted to the edge position adjustor 113.

The operation command holder 111 holds, for example, various data when films are formed on the wafer W, a target value related to a formation position of the edge of each film, and application conditions in the units U14 to U16 according to the target values. The operation command holder 111 may hold a target value of a removal width, as the target value related to the formation position of the edge of each film. The operation command holder 111 may hold location information indicating the positions of the nozzle 44 when the processing liquid L2 is applied toward the peripheral portions of the films, as the application conditions. These location information pieces may be set as different values according to the films including target edges.

The film formation controller 112 has a function of controlling the units U14 to U16 to form films on the wafer W. The film formation controller 112 causes the unit U1 to supply the processing liquid L1 or the processing liquid L2 toward the wafer W under the application conditions held in the operation command holder 111. For example, in order to remove the peripheral portion of the film (the coating film) formed by the processing liquid L1, the film formation controller 112 ejects the processing liquid L2 from the nozzle 44 in a state where the nozzle 44 is disposed at a position indicated by the location information.

The edge position adjustor 113 has a function of adjusting a relative position between the nozzle 44 and the wafer W when the processing liquid L2 is ejected. Specifically, the edge position adjustor 113 adjusts the relative positions on the basis of detection results of target edges, such that positions of target edges included in a plurality of films to be formed on a wafer W (hereinafter, referred to as a "subsequent wafer W") to be processed after an inspection target wafer W including the target edges, in the processing modules 14 to 16, approach target values. For example, when receiving a signal indicating that a removal width needs to be adjusted, the edge position adjustor 113 may calculate an adjustment value according to a deviation between the calculated removal width and the target value. The edge position adjustor 113 may correct application conditions held in the operation command holder 111 (for example, location information of the nozzle 44, and information on a position where the wafer W is held by the rotation holder 20) according to the calculated adjustment value. Accordingly, a film including a target edge at the adjusted edge position (the removal width) may be formed on the subsequent wafer W (the separate substrate). The edge position adjustor 113 may overwrite the application conditions of the operation command holder 111 with corrected application conditions so that the corrected application conditions may be stored in the operation command holder 111.

Figure 9:
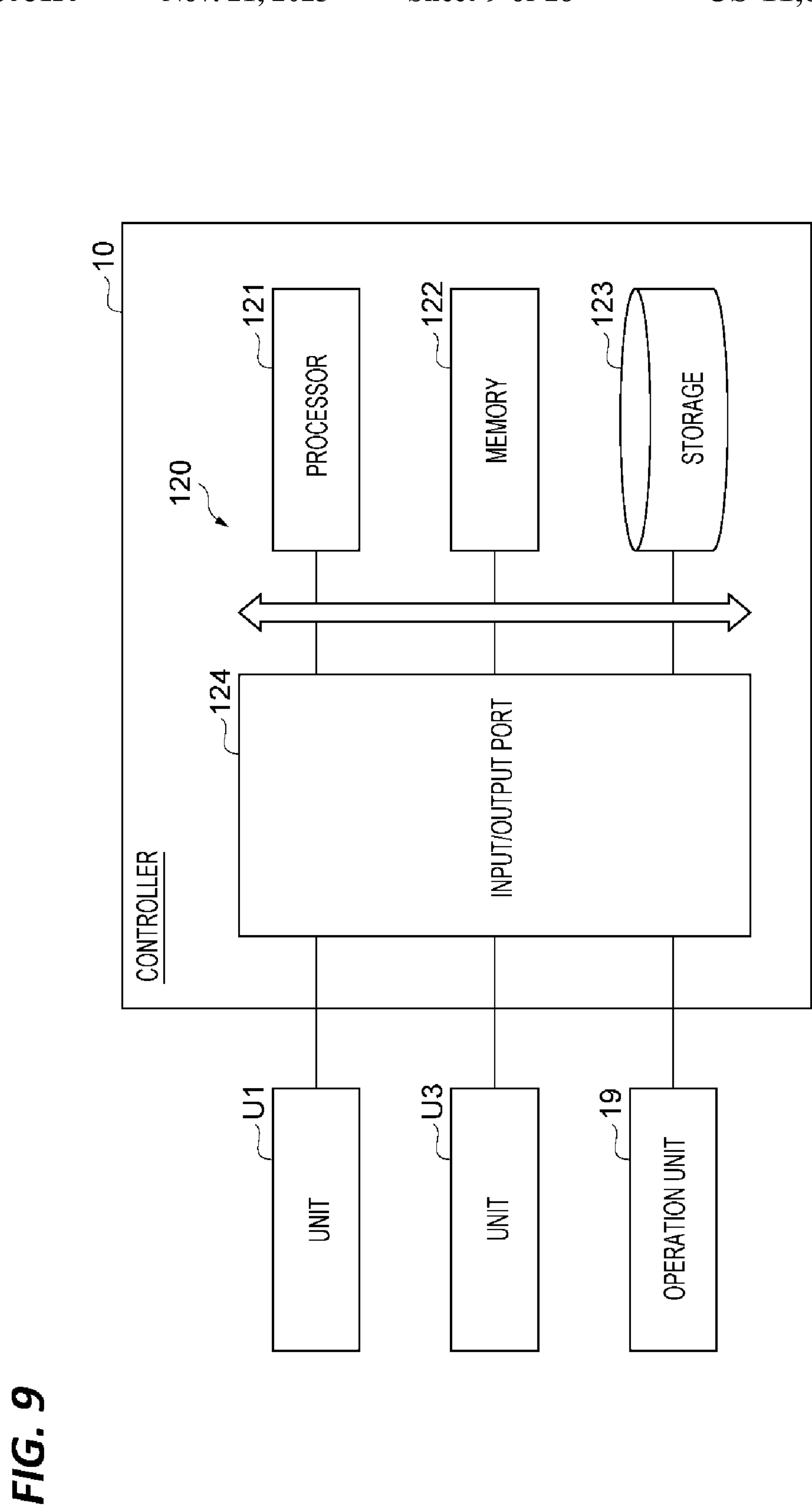
FIG. 9 is a schematic view illustrating an example of a hardware configuration of a controller.

The hardware of the controller 10 is constituted by, for example, one or more control computers. The controller 10 includes, as a configuration on the hardware, for example, a circuit 120 illustrated in FIG. 9. The circuit 120 may be composed of electric circuit elements (a circuitry). The circuit 120 specifically includes a processor 121, a memory 122 (a storage), a storage 123 (a storage), and an input/output port 124. The processor 121 executes a program in cooperation with at least one of the memory 122 and the storage 123, and executes input/output of signals through the input/output port 124, thereby configuring each of the above described function modules. The input/output port 124 performs input/output of signals between the processor 121, the memory 122, and the storage 123, and various devices of the substrate processing system 1.

The substrate processing system 1 includes one controller 10, but may include a controller group (a controller) constituted by a plurality of controllers 10. When the substrate processing system 1 includes the controller group, each of the function modules may be realized by one controller 10, or realized by a combination of two or more controllers 10. When the controller 10 is constituted by a plurality of computers (the circuit 120), each of the function modules may be realized by one computer (the circuit 120), or realized by a combination of two or more computers (the circuit 120). The controller 10 may include a plurality of processors 121. In this case, each of the function modules may be realized by one or more processors 121.

[Substrate Processing Method]

Subsequently, descriptions will be made on a substrate processing method including a method of forming a plurality of films on a wafer W and a method of inspecting the state of the edge of each of the formed films (an edge inspection processing), with reference to FIGS. 10 to 17.

In the substrate processing method, first, the controller 10 controls the transfer arms A1 and A2 such that the transfer arms A1 and A2 take one wafer W out of the carrier 11, and transfer the wafer W into the unit U14. Next, the controller 10 controls the unit U14 to supply the processing liquid L1 to the wafer W as illustrated in FIG. 11A (step S11 in FIG. 10). In step S11, for example, the film formation controller 112 controls the driving mechanism 36 to dispose the nozzle 34 above the holder 23. Then, the film formation controller 112 controls the rotation holder 20 so that the wafer W is held by the holder 23, and is rotated at a predetermined rotation speed. In this state, the film formation controller 112 controls the pump 32 and the valve 33 so as to eject the processing liquid L1 from the nozzle 34 toward the front surface Wa of the wafer W. Accordingly, an unsolidified film R1 is formed on the entire front surface Wa of the wafer W.

Figure 10:
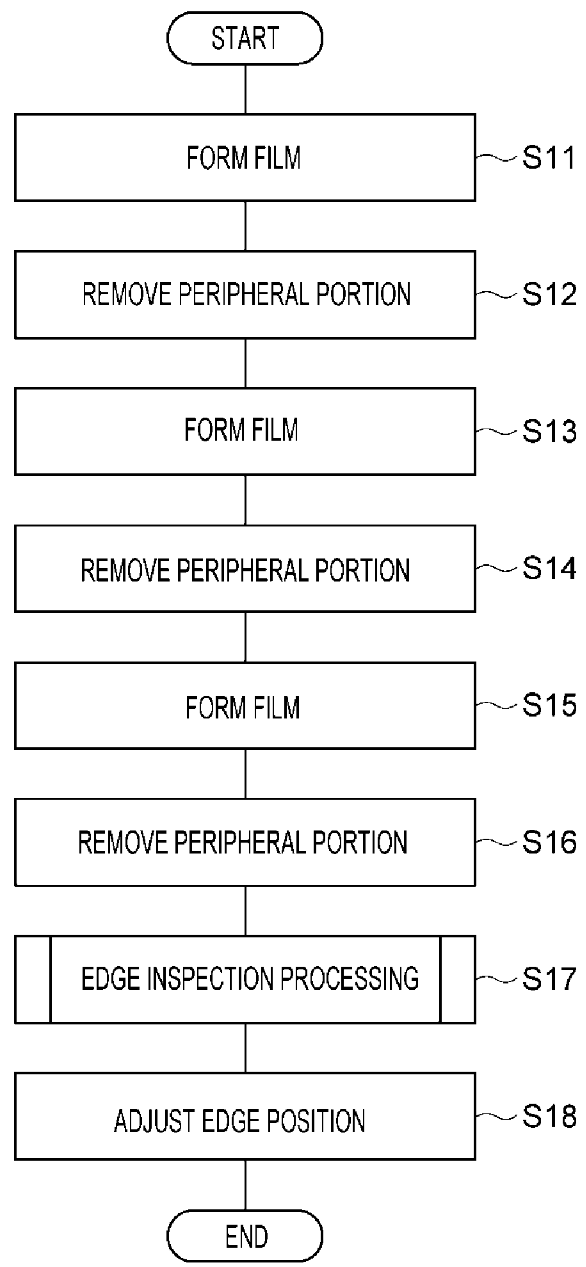
FIG. 10 is a flowchart illustrating an example of a substrate processing method.
Figure 11A:
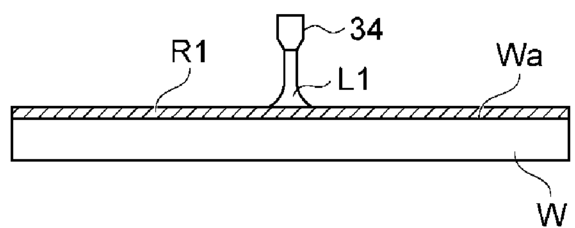
FIGS. 11A to 11C are views for explaining an example of a formation process of a plurality of films.
Figure 11B:
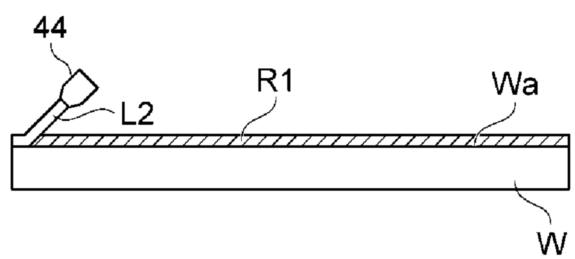

Next, the controller 10 controls the unit U14 so as to remove a portion of the unsolidified film R1 located at the periphery Wd of the front surface Wa of the wafer W (a peripheral portion of the film R1) (step S12 in FIG. 10). In step S12, for example, the film formation controller 112 controls the driving mechanism 46 to dispose the nozzle 44 at a position indicated by location information of the nozzle 44 held in the operation command holder 111. Then, the film formation controller 112 controls the rotation holder 20 so that the wafer W is held by the holder 23, and is rotated at a predetermined rotation speed. In this state, the film formation controller 112 controls the pump 42 and the valve 43 so as to eject the processing liquid L2 from the nozzle 44 toward the periphery Wd of the front surface Wa of the wafer W. Accordingly, as illustrated in FIG. 11B, the peripheral portion of the film R1 is dissolved by the processing liquid L2.

Figure 11C:
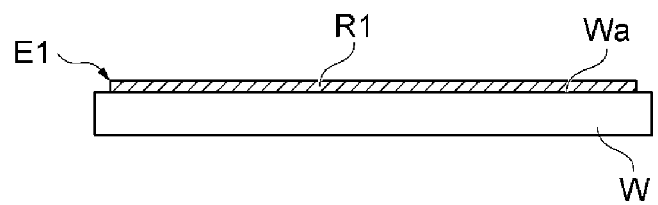

Next, the controller 10 controls the transfer arm A2 so that the transfer arm A2 transfers the wafer W from the unit U14 into the unit U24. Then, the controller 10 controls the unit U24 to heat the unsolidified film R1 together with the wafer W. Accordingly, as illustrated in FIG. 11C, the film R1 in an overall solidified state, from which the peripheral portion is removed, is formed on the front surface Wa of the wafer W.

Figure 12A:
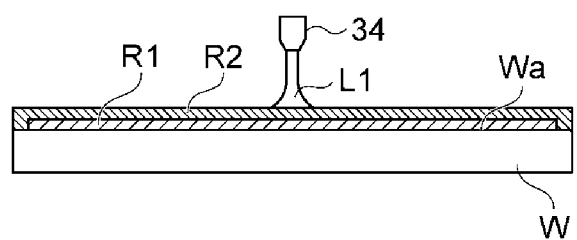
FIGS. 12A to 12C are views for explaining an example of the formation process of the plurality of films.

Next, the controller 10 controls the transfer arms A2, A3, and A7 such that the transfer arms A2, A3, and A7 transfer the wafer W from the unit U24 into the unit U15. Next, the controller 10 controls the unit U15 to supply the processing liquid L1 to the wafer W as illustrated in FIG. 12A (step S13 in FIG. 10). In step S13, the film formation controller 112 performs the same processing as step S11 so that an unsolidified film R2 is formed on the film R1.

Figure 12B:
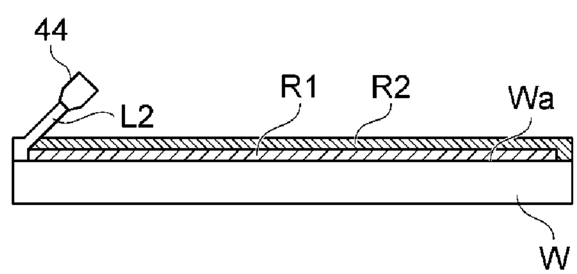

Next, the controller 10 controls the unit U15 so as to remove a peripheral portion of the unsolidified film R2 (step S14 in FIG. 10). In step S14, the film formation controller 112 disposes the nozzle 44 according to location information within the operation command holder 111 as in step S12. Then, as illustrated in FIG. 12B, the film formation controller 112 ejects the processing liquid L2 from the nozzle 44 toward the periphery Wd of the front surface Wa of the wafer W to dissolve the peripheral portion of the film R2. As for the processing liquid L2 for dissolving the peripheral portion of the film R2, a chemical liquid that is capable of partially dissolving the film R2, and hardly dissolves the film R1 may be used.

Figure 12C:
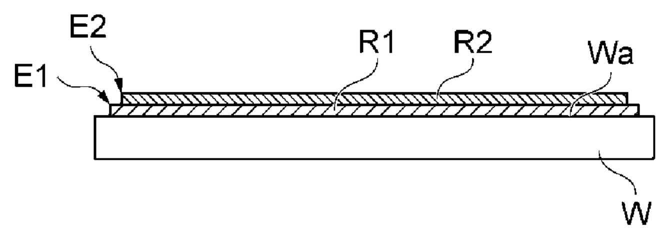

Next, the controller 10 controls the transfer arm A3 so that the transfer arm A3 transfers the wafer W from the unit U15 into the unit U25. Then, the controller 10 controls the unit U25 to heat the unsolidified film R2 together with the wafer W. Accordingly, as illustrated in FIG. 12C, the film R2 in an overall solidified state, from which the peripheral portion is removed, is formed on the film R1.

Figure 13A:
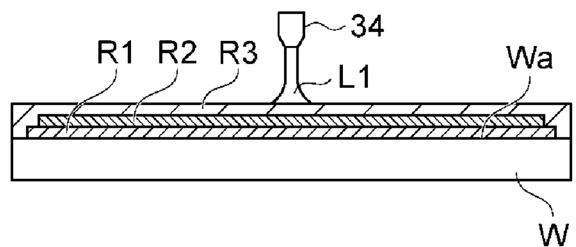
FIGS. 13A to 13C are views for explaining an example of the formation process of the plurality of films.

Next, the controller 10 controls the transfer arms A3, A4, and A7 such that the transfer arms A3, A4, and A7 transfer the wafer W from the unit U25 into the unit U16. Next, the controller 10 controls the unit U16 to supply the processing liquid L1 to the wafer W as illustrated in FIG. 13A (step S15 in FIG. 10). In step S15, the film formation controller 112 performs the same processing as steps S11 and S13 so that an unsolidified film R3 is formed on the film R2.

Figure 13B:
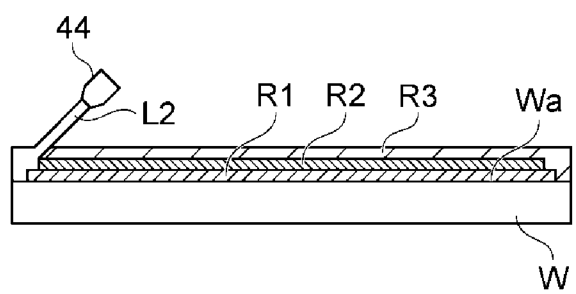

Next, the controller 10 controls the unit U16 so as to remove a peripheral portion of the unsolidified film R3 (step S16 in FIG. 10). In step S16, the film formation controller 112 disposes the nozzle 44 according to location information within the operation command holder 111 as in steps S12 and S14. Then, as illustrated in FIG. 13B, the film formation controller 112 ejects the processing liquid L2 from the nozzle 44 toward the periphery Wd of the front surface Wa of the wafer W to dissolve the peripheral portion of the film R3. As for the processing liquid L2 for dissolving the peripheral portion of the film R3, a chemical liquid that is capable of partially dissolving the film R3, and hardly dissolves the films R1 and R2 may be used.

Next, the controller 10 controls the transfer arm A4 so that the transfer arm A4 transfers the wafer W from the unit U16 into the heat treatment unit U26. Then, the controller 10 controls the unit U26 to heat the unsolidified film R3 together with the wafer W. Accordingly, as illustrated in FIG. 13C, the film R3 in an overall solidified state, from which the peripheral portion is removed, is formed on the film R2.

Figure 13C:
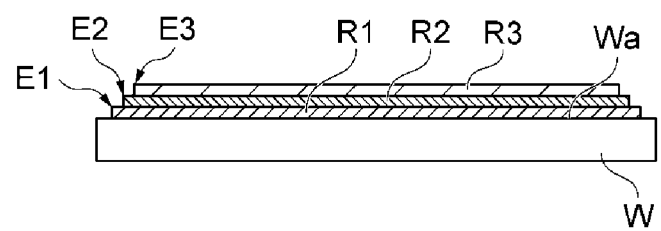

In the example illustrated in FIG. 13C, the films R1, R2, and R3 are formed in this order upwards from the front surface Wa of the wafer W. The films R1, R2, and R3 may be circular when viewed from above. An edge E1 included in the film R1, an edge E2 included in the film R2, and an edge E3 included in the film R3 extend along the periphery WE of the wafer W (see e.g., FIG. 15A). The "edge" in this specification refers to a line indicating a boundary between one film and another film, or a boundary between one film and the front surface (the exposed portion) of the wafer W, on any one of the front surface, the back surface and the end surface of the wafer W. For example, the "edge" may be an outer edge of the film when the wafer W is viewed from above. The films R1, R2, and R3 may be formed such that the films R1, R2, and R3 have diameters in descending order. That is, the edges E1, E2, and E3 may be sequentially arranged along a direction from the periphery WE of the wafer W toward the center (a radial direction of the wafer W). In some cases, in a certain range (a certain angle) in the circumferential direction of the wafer W, the order in which the edges E1, E2, and E3 are arranged varies depending on a condition under which the peripheral portion of each film is removed. In this example, the units U14 to U16 forming the films R1, R2, and R3 constitute film forming units.

Next, the controller 10 controls each unit of the substrate processing system 1 to perform an edge inspection processing on the wafer W on which the films R1, R2, and R3 including the edges E1, E2, and E3 are formed (step S17). Details of the edge inspection processing will be described below.

Next, the controller 10 adjusts each of formation conditions (edge positions) of the films R1, R2, and R3 including the edges E1, E2, and E3 according to the result of the edge inspection processing (step S18). In step S18, when the films R1, R2, and R3 are formed on a subsequent wafer W, the edge position adjustor 113 adjusts a relative position between the nozzle 44 and the wafer W at the time of ejection of the processing liquid L2. The edge position adjustor 113 may form the film R1 on the subsequent wafer W while adjusting the relative position, such that the position of the edge E1 of the subsequent wafer W approaches a predetermined target value, on the basis of the detection result of the inspection target edge E1.

For example, the edge position adjustor 113 may update (overwrite) location information on the nozzle 44 (the first nozzle) of the unit U14, which is held in the operation command holder 111, according to a deviation between a removal width of the film R1 measured on the basis of the detection result of the inspection target edge E1 (the first target edge) and the target value. The edge position adjustor 113 may update location information on the nozzle 44 (the second nozzle) of the unit U15, which is held in the operation command holder 111, according to a deviation between a removal width of the film R2 measured on the basis of the detection result of the inspection target edge E2 (the second target edge) and the target value. The edge position adjustor 113 may update location information on the nozzle 44 of the unit U16, which is held in the operation command holder 111, according to a deviation between a removal width of the film R3 measured on the basis of the detection result of the inspection target edge E3 and the target value.

[Edge Inspection Method]

Figure 14:
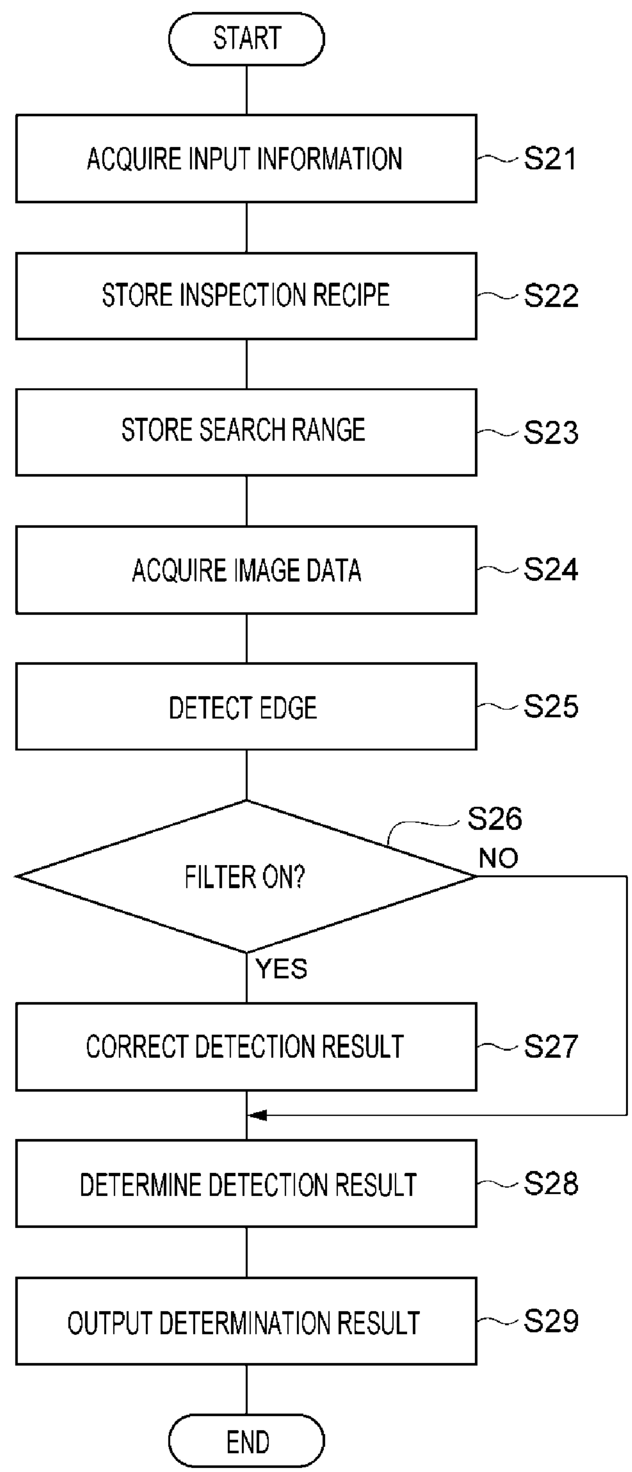
FIG. 14 is a flowchart illustrating an example of an edge inspection processing.

Subsequently, descriptions will be made on an inspection method (a substrate inspection method) of the edge of each of films formed on the wafer W, with reference to FIG. 14. First, the input information acquisition unit 103 of the controller 10 acquires input information from an operator through the operation unit 19 (step S21). The input information acquired in step S21 includes an inspection recipe and a search range used when each of the edges E1, E2, and E3 of the films R1, R2, and R3 is detected from image data.

Figure 15A:
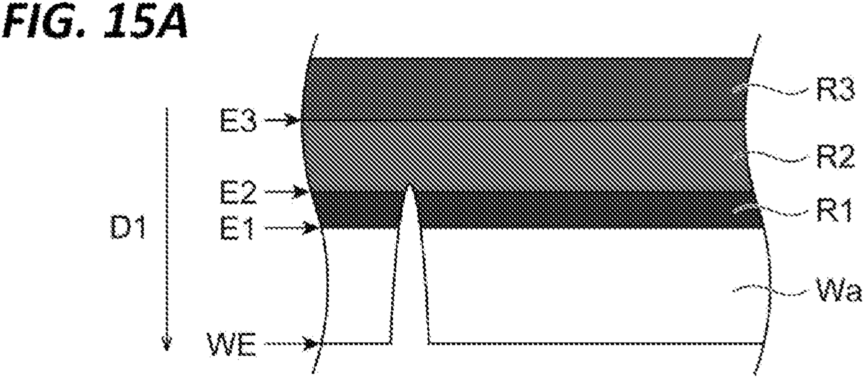
FIGS. 15A to 15C are views for explaining an example of edge detection from image data.

When each of edges is detected from image data, for example, data indicating a rectangular image obtained by imaging the periphery Wd of the front surface Wa of the wafer W may be used as the image data (see FIG. 15A). In the image illustrated in FIG. 15A, the horizontal direction on the sheet corresponds to the circumferential direction of the wafer W, and the vertical direction on the sheet corresponds to the radial direction of the wafer W. Hereinafter, in the following description, on the image indicated by the image data, the circumferential direction of the wafer W is set as the "horizontal direction," and the radial direction of the wafer W is set as the "vertical direction."

When an edge is detected from the image data, according to a contrast (a difference between gradations) in a group of pixels arranged in the vertical direction, a pixel displaying the edge is detected from the pixel group. For example, in a group of pixels arranged in the vertical direction, contrasts between adjacent pixels are sequentially calculated in one direction (upwards or downwards), and then a pixel that has a contrast exceeding a predetermined value is detected as an edge position. Such a processing of detecting the pixel corresponding to the edge, from the pixel group in the vertical direction is performed for each of pixel groups (for example, 360 points) in the horizontal direction. In some cases, since image data includes the plurality of edges E1, E2, and E3, it is not possible to detect an edge as a detection target, even if an attempt is made to simply detect the edge according to a contrast. Therefore, the inspection recipe and the search range for detecting each edge may be set according to the edge as the detection target.

The inspection recipe is configured by combining parameters each of which has one option specified among a plurality of options. That is, the inspection recipe includes a plurality of parameters, and each of the parameters is determined by selecting one of options. The settings of a combination of parameters constituting the inspection recipe are different from each other according to target edges. Specifically, an inspection recipe (hereinafter, referred to as an "inspection recipe IR1") for detecting the edge E1 is determined such that the edge E1 is detected, and the edges E2 and E3 are not detected from the image data including the edges E1, E2, and E3. Inspection recipes (hereinafter, referred to as an "inspection recipe IR2," and an "inspection recipe IR3") for detecting the edges E2 and E3 are also determined similarly to the inspection recipe IR1.

The parameters include an image gradient parameter, a conversion parameter, a search direction parameter, a priority parameter, and a filter parameter. The parameters may include at least one of the conversion parameter, the search direction parameter, the priority parameter and the filter parameter.

The image gradient parameter is a condition indicating which image gradient is used to detect an edge. The "image gradient" indicates a direction in which a gradation changes on image data. For example, the image gradient includes a direction in which a gradation changes from "dark" to "bright" (a direction in which a gradation change rises) and a direction in which a gradation changes from "bright" to "dark" (a direction in which a gradation change lowers). The image gradient parameter may include, for example, "Positive" and "Negative" as options. The "Positive" is an option used for determining a point having a large contrast (a point exceeding a predetermined value) in a direction in which a gradation changes from "dark" to "bright," as an edge candidate. The "Negative" is an option used for determining a point having a large contrast (a point exceeding a predetermined value) in a direction in which a gradation changes from "bright" to "dark," as an edge candidate.

The conversion parameter indicates a conversion condition for converting color attributes of inspection image data. The color attributes are three properties of hue, lightness and saturation. Edge detection is performed by using image data that is obtained by converting a combination of gradations (RGB values) of each color for each pixel in the inspection image data (as a color image), into white-black multiple gradations (for example, 256 gradations). The condition for converting the inspection image data into the image data with the white-black multiple gradations may be referred to as an "image color." For example, the conversion parameter may include "gray-scale," "red," "green," and "blue," as options.

The "gray-scale" is an option used for converting the inspection image data into white-black multiple gradations according to, for example, an average value of RGB values for each pixel in the inspection image data. In the "red," for example, for each pixel, image data obtained by converting an R value into white-black multiple gradations is used, in which among RGB values, gradations of green and blue other than red are excluded. That is, in the converted image data, a pixel including a strong red component in an original color image is more brightly expressed, (close to white). Similarly to the "red," in the "green" or the "blue" as well, image data obtained by converting a gradation of a single color (a G value or a B value) into white-black multiple gradations is used, in which among RGB values, gradations of other two colors are excluded. Besides the above described four options, image data obtained by converting an average value of gradations of two colors among red, green and blue into white-black multiple gradations may be used.

The search direction parameter is a condition indicating a direction in which a search for an edge is performed in the vertical direction (a direction in which contrasts are sequentially calculated). The search direction parameter may include, for example, "From center" and "From edge" as options. The "From center" is an option used for searching for an edge in order from top to bottom (a direction D1 from the center of the wafer W toward the periphery WE). The "From edge" is an option used for searching for an edge in order from bottom to top (in a direction D2 from the periphery WE of the wafer W toward the center).

The priority parameter is a condition that defines a priority (a selection method) for selecting a target edge from a plurality of edge candidates. In some cases, in a pixel group in the vertical direction, there is a plurality of edge candidates having contrasts equal to or higher than a predetermined value. In this case, which edge candidate is to be selected (detected) as a target edge is determined by the priority parameter. The priority parameter may include for example, "First" and "High contrast" as options. The "First" is an option used for selecting an edge candidate that is first found, as an edge. The "High contrast" is an option used for selecting an edge candidate having the largest contrast from a plurality of edge candidates, as an edge.

The filter parameter is a condition indicating whether to use filtering for removing an influence of a disturbance included in an edge. In some cases, due to various causes (disturbance), a film edge includes a portion (an unusual portion) not extending along the circumferential direction. By using the filtering, an influence of such an unusual portion is reduced. The filter parameter may include, for example, "ON" and "OFF" as options. The "ON" is an option used for performing a correction processing by the edge corrector 106. The "OFF" is an option used for omitting a correction processing by the edge corrector 106.

In the above described example, the image gradient parameter includes two options, the conversion parameter includes four options, the search direction parameter includes two options, the priority parameter includes two options, and the filter parameter includes two options. Thus, by selecting one combination among 64 combinations, an inspection recipe for one target edge is determined.

Figure 16:
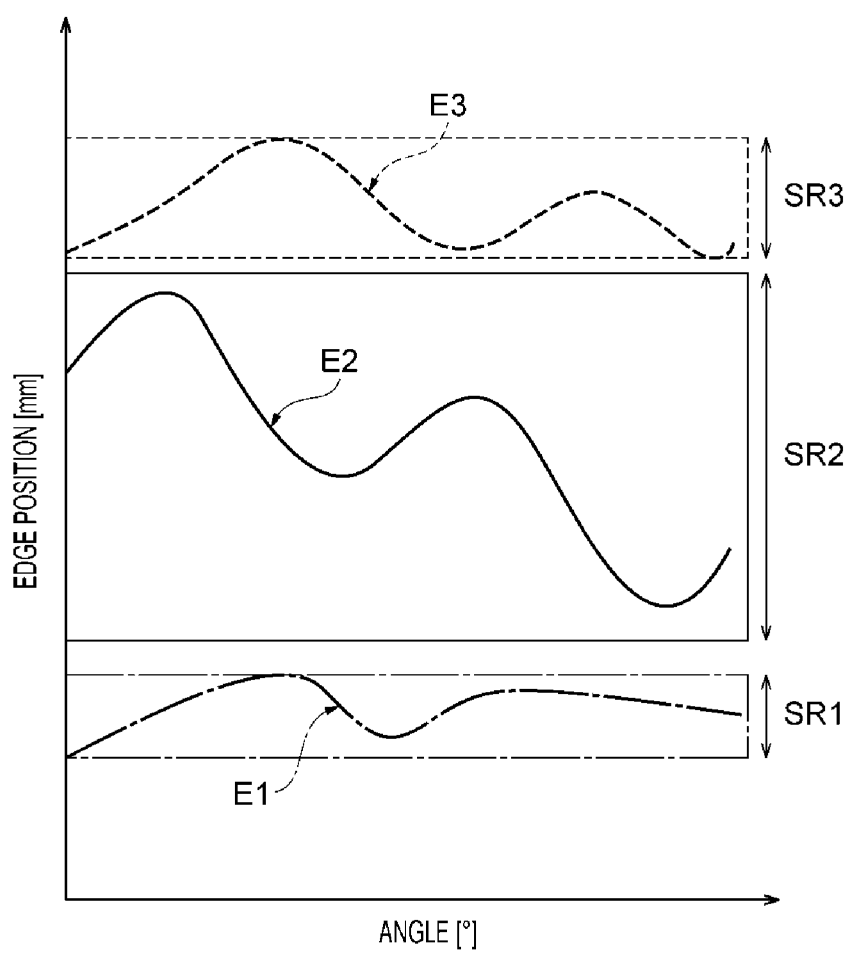
FIG. 16 is a view for explaining an example of a variation range of each of edges of the plurality of films.

The search range is used when each of the edge E1 of the film R1, the edge E2 of the film R2, and the edge E3 of the film R3 is detected from image data. The search range defines a range in which a search for a target edge from a group of pixels arranged in the vertical direction (an intersecting direction that intersects with a direction in which an edge extends on the image) is performed. As illustrated in FIG. 16, variation ranges of the edges E1, E2, and E3 in the radial direction (the intersecting direction) are different from each other. The variation ranges are ranges in which the edges E1, E2, and E3 are expected to be present, on the basis of formation conditions for forming the films R1, R2, and R3. For example, the search range may be set by the operator according to a range in which each of the edges E1, E2, and E3 is expected to be present. The operator may input a target width indicating an expected value of a maximum width (for example, a difference between a position closest to the periphery WE and a position farthest from the periphery WE in the intersecting direction) of each of the edges E1, E2, and E3.

Figure 17:
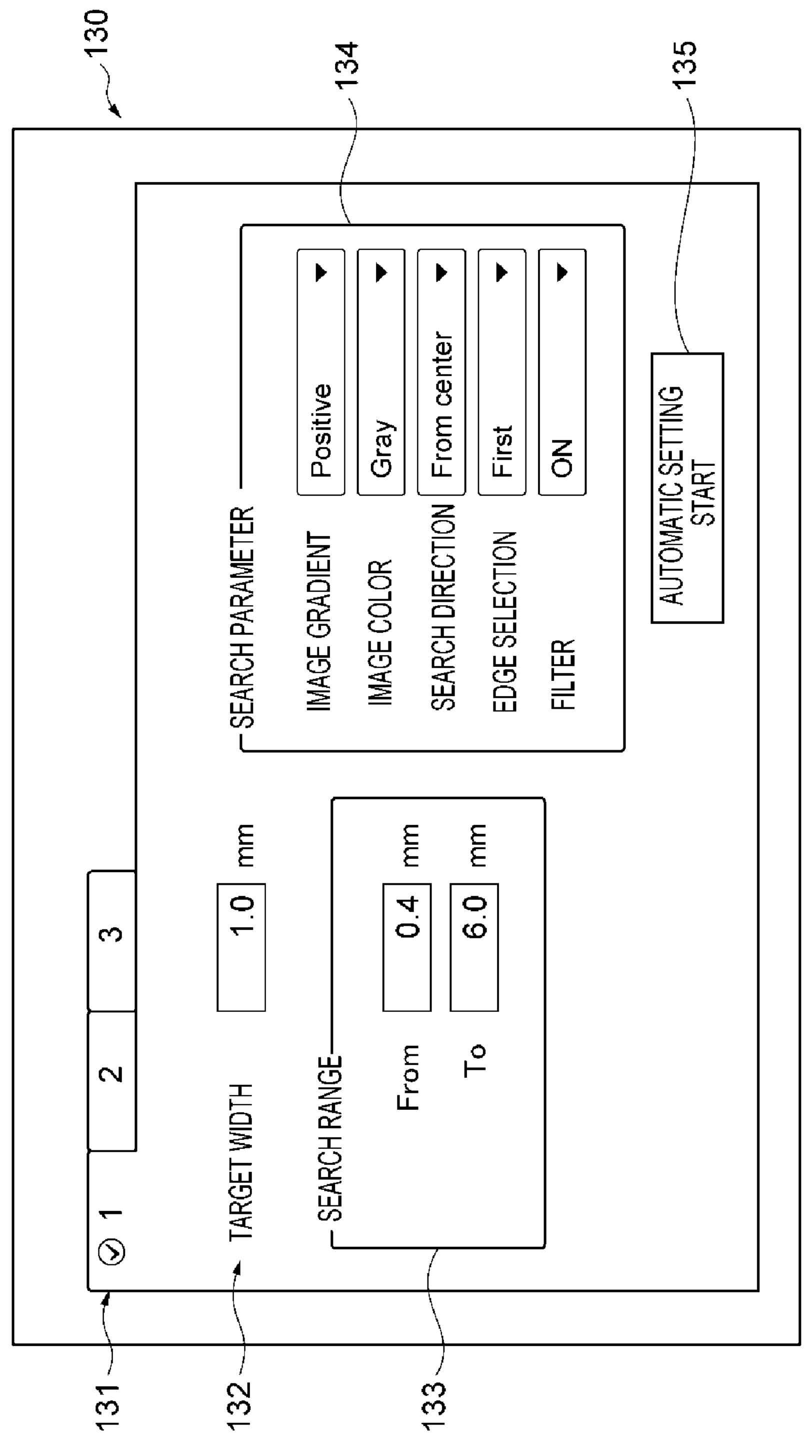
FIG. 17 is a view illustrating an example of an operation screen included in an operation unit.

FIG. 17 illustrates an example of an operation screen through which the operator inputs a plurality of detection conditions including inspection recipes and search ranges, to the substrate inspection unit 100. The operation unit 19 may include a display device that displays an operation screen 130. The operation screen 130 includes a selection tab 131, a target width setting screen 132, a search range setting screen 133, and a parameter setting screen 134. Through the selection tab 131, a detection condition to be set is selected from a plurality of detection conditions. In the example illustrated in FIG. 17, a screen for setting a detection condition corresponding to the edge E1 (a detection condition for detecting the edge E1) has been selected. On the target width setting screen 132, a target width indicating a width of the target edge corresponding to the detection condition being set is input. On the search range setting screen 133, a search range of the target edge corresponding to the detection condition being set is input. On the parameter setting screen 134, for each of parameters, one of options is selected. Such information input to the operation screen 130 is output to the input information acquisition unit 103, as input information from the operator. That is, the input information acquisition unit 103 may acquire the inspection recipes and the search ranges according to the input information operated on the operation screen 130.

Referring back to FIG. 14, after acquiring the input information in step S21, the controller 10 stores a plurality of set inspection recipes (step S22). In step S22, the input information acquisition unit 103 outputs the inspection recipes to the storage 102, and the storage 102 stores the inspection recipes. Accordingly, for each of the edges E1, E2, and E3, the storage 102 stores a recipe configured by combining parameters each of which has one option specified among a plurality of options, as each of inspection recipes IR1, IR2, and IR3. Combinations of parameters constituting the inspection recipes IR1, IR2, and IR3 may be different from each other.

Next, the controller 10 stores search ranges set for the edges E1, E2, and E3, respectively (hereinafter, referred to as "search ranges SR1, SR2, and SR3") (step S23). In step S23, the input information acquisition unit 103 outputs the set search ranges to the storage 102, and the storage 102 stores the search ranges.

Next, the controller 10 controls the unit U3 to acquire inspection image data (step S24). In step S24, for example, the image data acquisition unit 104 acquires captured image data generated by imaging the periphery of the wafer W, as inspection image data, from the unit U3. For example, the image data acquisition unit 104 may acquire the captured image data (the inspection image data) having color information, which is obtained through imaging by the periphery imaging subunit 80 in the unit U3. The image data acquisition unit 104 outputs the acquired inspection image data to the storage 102, and the storage 102 stores the inspection image data.

Next, the controller 10 detects inspection target edges on the basis of the inspection image data stored in the storage 102 (step S25). In step S25, the edge detector 105 detects inspection target edges from the image data stored in the storage 102 by using the inspection recipes and the search ranges stored in the storage 102. Specifically, the edge detector 105 detects the edge E1 within the search range SR1 of image data converted from the inspection image data according to a conversion parameter of the inspection recipe IR1, by using the inspection recipe IR1. The edge detector 105 detects the edge E2 within the search range SR2 of image data converted from the inspection image data according to a conversion parameter of the inspection recipe IR2, by using the inspection recipe IR2. The edge detector 105 detects the edge E3 within the search range SR3 of image data converted from the inspection image data according to a conversion parameter of the inspection recipe IR3, by using the inspection recipe IR3. The edge detector 105 may detect the inspection target edge at each of measurement positions (pixels arranged in the horizontal direction) of 360 points arranged at 1° intervals in the circumferential direction of the wafer W.

FIG. 15A illustrates a drawing for explaining detection of the edge E1 using the inspection recipe IR1 and the search range SR1. In the inspection recipe IR1 in this example, an image gradient parameter may be set to "Positive," a conversion parameter may be set to "gray-scale," a search direction parameter may be set to "From center," a priority parameter may be set to "First," and a filter parameter may be set to "OFF." The search range may be set as a range from "0.8 mm" to "1.4 mm."

In this case, contrasts are sequentially calculated in the direction D1 (downwards) from the center toward the periphery WE in the intersecting direction on the image, and then a pixel in the vertical direction, in which a contrast from "dark" to "bright" is larger than a predetermined value, is extracted as an edge candidate. That is, even if there is a pixel, in which a contrast from "bright" to "dark" in the direction D1 is larger than the predetermined value, the pixel is not extracted as an edge candidate. Even if there is a pixel in which a contrast from "dark" to "bright" is larger than the predetermined value, in the direction D2 (upwards) from the periphery WE toward the center in the intersecting direction on the image, the pixel is not extracted as an edge candidate. Even if there is a pixel outside the search range, in which a contrast from "dark" to "bright" in the direction D1 is larger than the predetermined value, the pixel is not extracted as an edge candidate. When there is a plurality of edge candidates, an edge candidate that is first found is detected as a target edge.

In the example illustrated in FIG. 15A, before and after the edge E3 on the image, the luminance of a group of pixels arranged in the vertical direction changes from "dark" to "bright" in the direction D1. However, since the edge E3 is located outside the search range SR1, even when a contrast before and after the edge E3 is larger than the predetermined value, the edge E3 is not detected. In the edge E2 on the image, since there is a change from "bright" to "dark" in the direction D1, the edge E2 is not detected. In this manner, the edge E1 is detected on the basis of the inspection image data without detecting the edges E2 and E3 by using the inspection recipe IR1 and the search range SR1 which are set such that the edges E2 and E3 are not detected, and the edge E1 is detected. When the inspection recipe and the search range are set by the operator, the operator may set the inspection recipe IR1 and the search range SR1 by which the edge E1 is extractable by repeating setting of the inspection recipe and the search range and trial of edge detection.

Figure 15B:
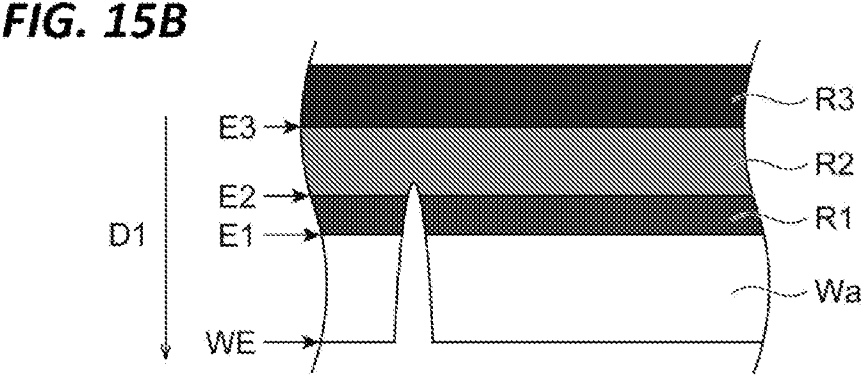

FIG. 15B illustrates a drawing for explaining detection of the edge E2 using the inspection recipe IR2 and the search range SR2. In the inspection recipe IR2 in this example, an image gradient parameter is set to "Negative," a conversion parameter is set to "red," a search direction parameter is set to "From center," a priority parameter is set to "First," and a filter parameter is set to "OFF." The search range is set as a range from "1.2 mm" to "1.8 mm" In this case as well, similarly to the example of FIG. 15A, the edge E2 is detected on the basis of the inspection image data without detecting the edges E1 and E3.

Figure 15C:
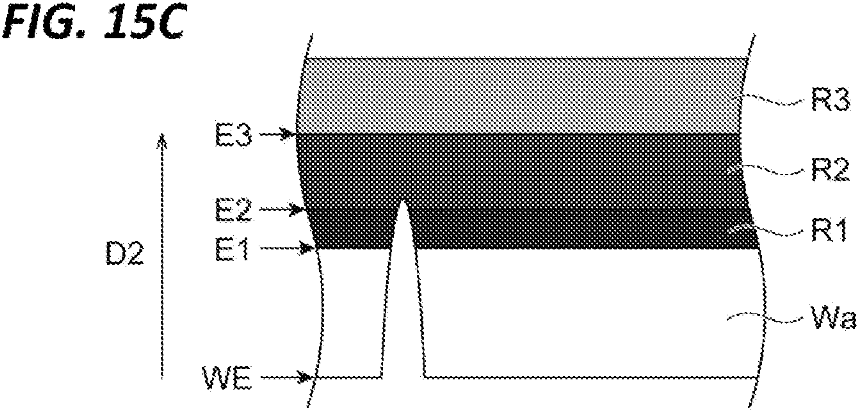

FIG. 15C illustrates a drawing for explaining detection of the edge E3 using the inspection recipe IR3 and the search range SR3. In the inspection recipe IR3 in this example, an image gradient parameter is set to "Positive," a conversion parameter is set to "blue," a search direction parameter is set to "From edge," a priority parameter is set to "High contrast," and a filter parameter is set to "OFF." The search range is set as a range from "1.8 mm" to "2.5 mm" In this case as well, similarly to the example of FIG. 15A, the edge E3 is detected on the basis of the inspection image data without detecting the edges E1 and E2.

As in the examples illustrated in FIGS. 15A to 15C, the edge detector 105 detects each of the edges E1, E2, and E3 from various image data pieces converted from one captured image data piece according to the conversion parameters of the inspection recipes. The edge detector 105 may output a detection result of the target edge to the edge corrector 106.

Next, the controller 10 determines whether a filter parameter is set to "ON" (step S27). In step S27, when the filter parameter is not set to "ON" (set to "OFF"), the controller 10 does not execute step S27. In this case, the edge corrector 106 outputs a detection result of the inspection target edge, as it is, to the determination unit 107.

In step S27, when the filter parameter is set to "ON," the edge corrector 106 of the controller 10 performs filtering on the detection result output from the edge detector 105. That is, the edge corrector 106 performs a correction processing on the detection result of the inspection target edge. For example, the edge corrector 106 may perform a correction processing of calculating a difference between a reference line calculated by smoothing a data sequence of the target edge, and each data piece included in the data sequence, and excluding a data piece whose difference is larger than a predetermined threshold from data pieces. The edge corrector 106 outputs the corrected detection result (for example, the detection result from which an abnormal value is excluded) to the determination unit 107.

Next, the controller 10 determines the state of the target edge (step S28). In step S28, the determination unit 107 determines the state of each of the edges E1, E2, and E3. For example, the determination unit 107 may calculate the removal width in the peripheral portion of each of the films R1, R2, and R3 including the edges E1, E2, and E3, and determine whether the calculated removal width falls within an allowable range. The determination unit 107 may calculate an average of removal widths at a plurality of measurement positions, as the removal width in the peripheral portion. Otherwise, for each of the edges E1, E2, and E3, the determination unit 107 may determine whether the calculated removal width falls within a range in which the removal width needs to be adjusted. The determination unit 107 outputs a determination result to the output unit 108.

Next, the controller 10 outputs the determination result (step S29). For example, when the calculated removal width falls within a range in which the removal width needs to be adjusted, the output unit 108 may output a signal indicating that adjustment is required, to the edge position adjustor 113. In this case, the edge position adjustor 113 may adjust the formation condition (location information of the nozzle 44) of each of the edges E1, E2, and E3 in steps S12, S14, and S16 to be performed on a subsequent wafer W.

[Action]

According to the above example, an inspection recipe is configured by combining parameters each of which has one option specified among a plurality of options. Even if an attempt is made to detect a target edge among a plurality of edges on the basis of a captured image (image data) of a substrate on which films each including an edge are formed, when an edge is detected by simply using a contrast ratio, edges other than the target edge may be detected. According to the above example, since an inspection recipe is configured by a combination of options of parameters, it is possible to set an inspection recipe proper for a target edge. That is, when inspection image data includes a plurality of edges, it is possible to set an inspection recipe having a combination of parameters by which only a target edge is detectable. As a result, it is possible to more securely detect an inspection target edge among a plurality of edges, from inspection image data.

According to the above example, an inspection recipe is configured by combining parameters each of which has one option specified by an operation input from an operator. In this case, the inspection recipe is configured by combining parameters which are specified after the operator performed a trial of target edge detection. Thus, it is possible to configure an inspection recipe by which a target edge is more securely detectable among a plurality of edges from inspection image data.

According to the above example, the edge corrector 106 is configured to perform a correction processing of calculating a difference between a reference line calculated by smoothing a data sequence of a target edge detected by the edge detector 105, and each data piece included in the data sequence, and excluding a data piece whose difference is larger than a predetermined threshold from data pieces. In this case, in a detection result corrected by the edge corrector, abnormal data whose difference is larger than the threshold is excluded from an edge detection result. Thus, it is possible to detect a target edge with higher accuracy.

According to the above example, the edge detector 105 is configured to detect target edges E1 to E3 within search ranges on the basis of inspection image data and the search ranges, and sizes of the search ranges SR1 to SR3 are set according to variation ranges of the target edges in an intersecting direction. In this case, on the inspection image data, even if there is an edge whose change amount of a contrast ratio is equal to or larger than a predetermined threshold, in addition to a target edge, since a search is performed in a search range based on a variation range of the target edge, only the target edge may be detected. Thus, it is possible to detect a target edge from inspection image data without detecting edges other than the target edge among a plurality of edges.

According to the above example, parameters may include at least one selected from a group including a conversion parameter, a search direction parameter, a priority parameter, and a filter parameter. In this case, it is possible to configure an inspection recipe according to the feature of a target edge among a plurality of edges.

According to the above example, the edge detector 105 is configured to detect one target edge as an edge of one inspection target film among a plurality of films, on the basis of inspection image data by using one inspection recipe, and is configured to detect another target edge as an edge of another inspection target film among the plurality of films on the basis of the inspection image data by using another inspection recipe. Then, a combination of parameters constituting one inspection recipe is different from a combination of parameters constituting another inspection recipe. In this case, only one target edge may be detected on the basis of inspection image data by one inspection recipe, and only another target edge may be detected on the basis of the inspection image data by another inspection recipe. Thus, it is possible to more securely detect each inspection target edge among a plurality of edges, from inspection image data.

According to the above example, the edge position adjustor 113 adjusts a relative position between the wafer W and the nozzle 44 of each of the units U14, U15, and U16 at the time of ejection of the processing liquid L2, on the basis of detection results of a plurality of target edges, such that positions of edges in a subsequent wafer W corresponding to the target edges approach target values. In this case, on the subsequent wafer W, an adjustment is also performed so that the positions of the edges corresponding to the target edges are brought close to the target values. That is, it is possible to efficiently perform adjustment of positions of a plurality of edges in a subsequent wafer W.

[Modifications]

The disclosure in this specification should be considered to be illustrative and not restrictive in all aspects. For example, various omissions, substitutions, and changes may be performed on above examples within a range not departing from claims and the gist thereof.

Figure 18A:
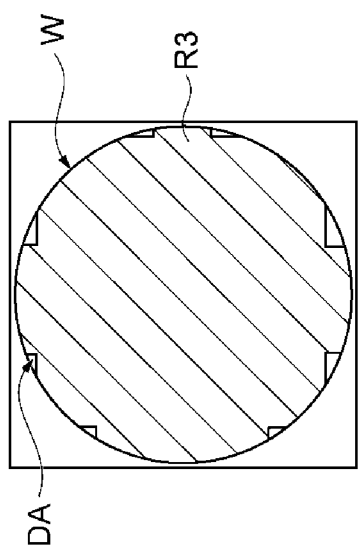
FIGS. 18A and 18B are views for explaining an example of a non-detection region included in a part of a detection target edge.
Figure 18B:
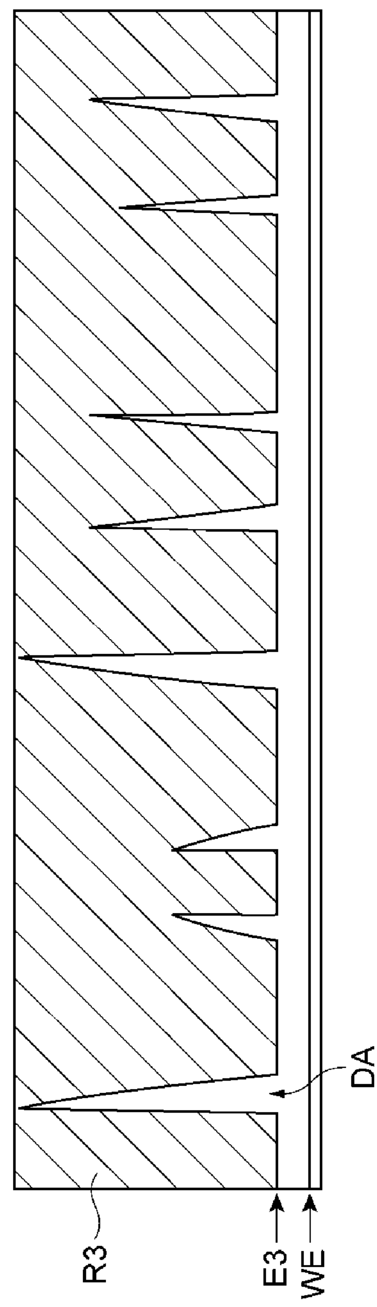

(1) For example, as illustrated in FIGS. 18A and 18B, in some cases, there is a region DA in the outer peripheral portion of the film R3, in which the edge E3 is not formed along the circumferential direction of the wafer W. FIG. 18A schematically illustrates an image obtained by imaging the entire front surface Wa of the wafer W. FIG. 18B schematically illustrates an image obtained by imaging the periphery Wd of the front surface Wa of the wafer W. For example, in some cases, the region DA is constituted by a portion unexposed at the time of an exposure processing, in the peripheral portion of the film R3. The storage 102 may store a region DA (a non-detection region) to be excluded from edge detection in the circumferential direction of the wafer W, and a region (a detection region) other than the region DA, as a target for edge detection in the circumferential direction of the wafer W. For example, the storage 102 may store a non-detection region and a detection region on the basis of input information from an operator. Otherwise, the controller 10 may specify a non-detection region by detecting a region DA from inspection image data, and specify a remaining portion as a detection region. The non-detection region and the detection region specified by the controller 10 may be stored in the storage 102.

The edge corrector 106 may perform a correction processing of excluding data (data within a non-detection region) outside a detection region, from a detection result obtained by the edge detector 105. After performing the correction processing of excluding the data outside the detection region, the edge corrector 106 may further perform a separate correction processing of excluding an abnormal value by approximating the corrected detection result. The controller 10 may include two function modules (edge correctors) which separately execute these two correction processings.

In this modification, in a detection result corrected by the edge corrector 106, a portion in a target edge located outside a detection region is excluded. Thus, it is possible to adjust a portion to be detected in the target edge. Accordingly, for example, it is possible to exclude a region DA as illustrated in FIGS. 18A and 18B, from a detection target.

(2) The edge detector 105 may detect a portion in a target edge located within a detection region, by using an inspection recipe and the detection region stored in the storage 102. That is, the edge detector 105 may detect an inspection target edge at a measurement position present in the detection region among a plurality of measurement positions arranged at a predetermined interval along the entire circumference of the wafer W in the circumferential direction. In this case, on a detection result of the target edge within the detection region, the edge corrector 106 may perform a correction processing of excluding an abnormal value by approximating the detection result.

In this modification, a specific portion in a target edge is detected according to a preset detection region. Thus, it is possible to adjust a portion to be detected in the target edge. Accordingly, for example, it is possible to exclude a region DA as illustrated in FIGS. 18A and 18B, from a detection target.

(3) The controller 10 may include, as a function module, an automatic setting unit that autonomously determines an inspection recipe. The automatic setting unit may specify one of options, for each of parameters constituting the inspection recipe, so as to obtain a result suitable for target edge detection. In this case, as illustrated in FIG. 17, the operation screen 130 of the display device included in the operation unit 19 may include an automatic setting start button 135. Upon receiving a signal indicating that the automatic setting start button 135 has been pressed by the operator, the automatic setting unit may autonomously determine an inspection recipe. Otherwise, the automatic setting unit may determine a plurality of inspection recipes suitable for detection, for one inspection target edge. The automatic setting unit may output one or more determined inspection recipes to the operation screen 130. Not only the inspection recipes as candidates, but also a description prompting the operator to select one inspection recipe may be displayed on the operation screen 130. When one inspection recipe is selected among the inspection recipes as the candidates by the operator, target edge inspection may be performed by using the inspection recipe.

Figure 19:
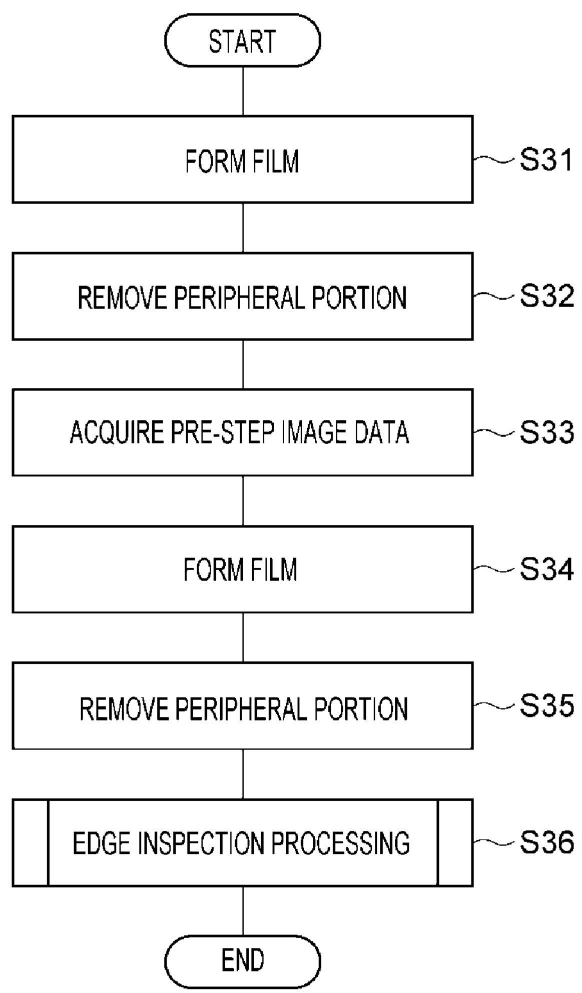
FIG. 19 is a flowchart illustrating another example of the substrate processing method.

(4) When a target edge is detected, image data obtained by imaging the wafer W on which the target edge is not yet formed may be used. Hereinafter, descriptions will be made on an example in which the film R1 (a pre-step film) and the film R2 are sequentially formed on the wafer W, and the edge E2 of the film R2 is set as a target edge, with reference to FIG. 19. In this example, each of the processing modules 14 and 15 may include the imaging unit U3 (the image capture unit).

First, the controller 10 (the film formation controller 112) controls the unit U14 so as to form the film R1 on the wafer W (step S31), and to remove the peripheral portion of the film R1 (step S32). Steps S31 and S32 are performed in the same manner as steps S11 and S12 illustrated in FIG. 10.

Next, the controller 10 acquires image data obtained by imaging the periphery of the wafer W before formation of the film R2 after formation of the film R1 (hereinafter, referred to as "pre-step image data") (step S33). In step S33, the image data acquisition unit 104 acquires pre-step image data from the unit U3 of the processing module 14. This pre-step image data does not include information indicating the edge E2 of the film R2, and includes information indicating the edge E1 of the film R1. The image data acquisition unit 104 outputs the acquired pre-step image data to the storage 102, and the storage 102 stores the pre-step image data.

Next, the controller 10 controls the unit U15 so as to form the film R2 on the film R1 from which the peripheral portion is removed (step S34), and to remove the peripheral portion of the film R2 (step S35). Steps S34 and S35 are performed in the same manner as steps S13 and S14 illustrated in FIG. 10. Next, the controller 10 performs an edge inspection processing (step S36). Step S36 is performed in the same manner as step S17 except that the pre-step image data is used. In the edge inspection processing in step S36, in the same manner as step S17, the inspection recipe IR2 for detecting the edge E2, on the basis of inspection image data obtained from captured image obtained by imaging the periphery Wd of the wafer W after the film R2 is formed, is stored in the storage 102. The inspection recipe IR1 for detecting the edge E1 from the pre-step image data and the inspection image data may be stored in the storage 102.

In the edge inspection processing in step S36, the edge detector 105 may detect the edge E2 by comparing information of the edges E1 and E2 indicated by the inspection image data to information of the edge E1 indicated by the pre-step image data. For example, the edge detector 105 may exclude information indicating the edge E1 by performing a difference processing between the inspection image data and the pre-step image data. Otherwise, the edge detector 105 may exclude information indicating the edge E1 by performing a difference processing between a detection result obtained by detecting the edge E1 from the pre-step image data, and a detection result obtained by detecting both the edges E1 and E2 from the inspection image data.

Figure 20A:
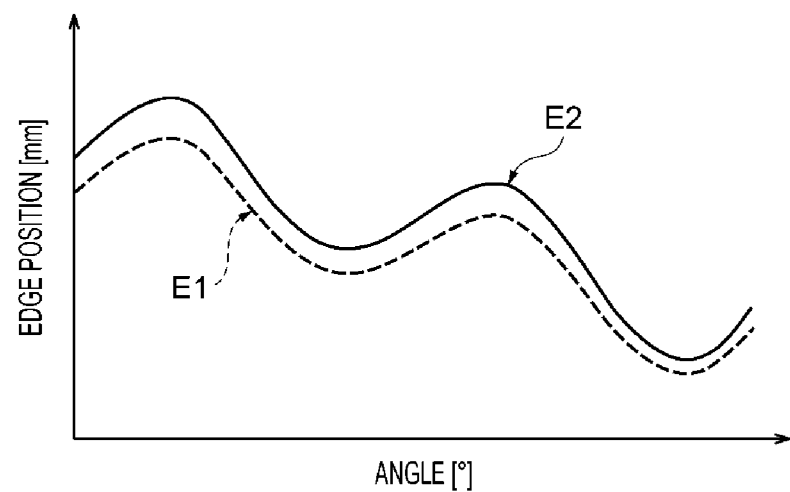
FIG. 20A is a view for explaining an example in which adjacent edges are close to each other.
Figure 20B:
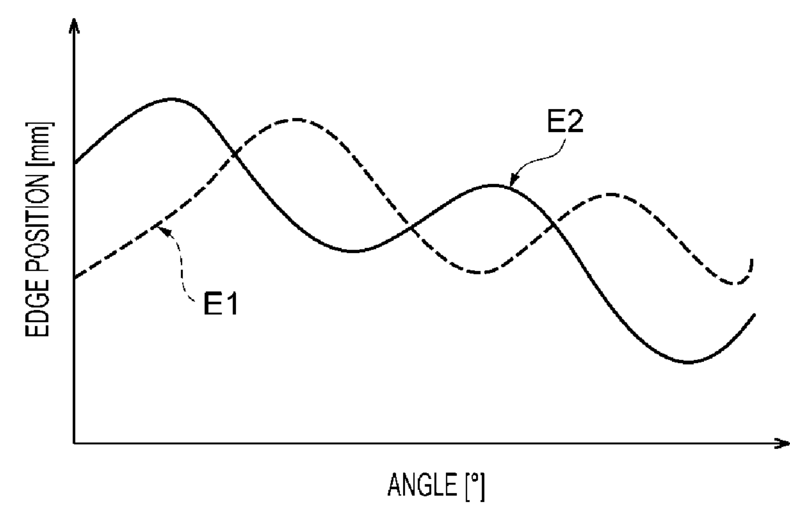
FIG. 20B is a view for explaining an example in which adjacent edges intersect with each other.

In some cases, depending on formation conditions of two films, as illustrated in FIG. 20A, the edges E1 and E2 are close to each other. Otherwise, in some cases, as illustrated in FIG. 20B, the edges E1 and E2 intersect with each other while being close to each other. That is, in some cases, in some regions in the circumferential direction of the wafer W, the edge E2 is located outside the edge E1, while in other regions, the edge E1 is located outside the edge E2. In these cases, when the edge E2 is detected from the inspection image data, there is a concern that the edge E1 may be detected instead of the edge E2 depending on the measurement position.

Meanwhile, in this modification, it is possible to remove information of the edge E1 of the pre-step film, which is indicated by the inspection image data, or information of the edge E1 of the pre-step film, which is included in the detection result obtained from the inspection image data, through the above difference processing. Thus, even when the edge E1 is formed close to the edge E2, it is possible to detect a target edge (the edge E2 in this example) with higher accuracy.

(5) The edge detector 105 may detect an inspection target edge by using an inspection recipe without using a search range.

(6) The substrate inspection unit 100 may not include the edge corrector 106. In this case, without correcting a detection result obtained by the edge detector 105, the determination on the detection result may be performed by the determination unit 107.

(7) The substrate inspection unit 100 may not include the determination unit 107. In this case, the output unit 108 may output a detection result obtained by the edge detector 105 or the detection result corrected by the edge corrector 106, to an element other than the substrate inspection unit 100 within the controller 10 or another device outside the controller 10.

(8) The determination unit 107 may calculate a difference between removal widths at measurement positions apart from each other by 180° in the circumferential direction of the wafer W from a detection result of an inspection target edge, so as to obtain an eccentricity value of a removal width (a shift between the center of a film from which the peripheral portion is removed and the center of the wafer W). When the eccentricity value of the removal width is larger than a threshold, the determination unit 107 may output a signal indicating that adjustment of eccentricity of the removal width is required, to the edge position adjustor 113. In this case, the edge position adjustor 113 may adjust a relative position between the wafer W and the nozzle 44 (for example, a position of the wafer W held by the rotation holder 20 of the unit U1) such that the eccentricity value of the removal width becomes a target value. The determination unit 107 may obtain a warpage of the wafer W when calculating the removal width of the peripheral portion of an inspection target film on the basis of the detection result of the inspection target edge, and correct the calculation result of the removal width according to the warpage. The edge position adjustor 113 may output an adjustment value of the removal width to the display device outside the controller 10, and a formation condition of each film (for example, location information of the nozzle 44) may be adjusted by input information of the operator.

(9) When four or more films are formed on the wafer W, the controller 10 (the substrate inspection unit 100) may perform an edge inspection processing on four or more target edges. The films including the target edges may not be formed on the wafer W in a state where the films are stacked with each other. For example, the substrate inspection unit 100 may perform an edge inspection processing on each of edges included in films arranged at a distance from each other in a diameter direction on the front surface Wa of the wafer W. The substrate inspection unit 100 may perform inspection of edges of films widening from the periphery Wd of the front surface Wa to the end surface Wc on the basis of image data obtained by imaging the periphery Wd of the front surface Wa of the wafer W, and the end surface Wc. In this case, the intersecting direction that intersects with the edge on the end surface Wc included in the captured image may correspond to a thickness direction of the wafer W. The substrate inspection unit 100 may perform inspection of edges of films widening from the periphery Wd of the front surface Wa to the end surface Wc and the periphery Wd of the back surface Wb on the basis of image data obtained by imaging the periphery Wd of the front surface Wa of the wafer W, the end surface Wc, and the periphery Wd of the back surface Wb.

(10) A timing at which an edge inspection processing is performed is not limited to the above described example. For example, when the wafer W on which films to be inspected are formed in advance is carried into the coating developing device 2, the substrate inspection unit 100 may perform an edge inspection processing on the wafer W prior to a forming processing of an underlayer film by the processing module 14. Otherwise, after a resist film (the film R3) is subjected to an exposure processing and then a development processing, the substrate inspection unit 100 may perform an edge inspection processing on the wafer W. In this case, although inspection target edge detection may be affected by a resist pattern, the detection result may be corrected by the edge corrector 106.

(11) The imaging unit U3 is not limited to the example illustrated in FIGS. 6 and 7, and only has to be configured to image at least an edge included in an inspection target film. The unit U3 may be provided in at least one of the processing modules 14 to 17. The unit U3 may be provided in the carrier block 4 or the interface block 6, instead of the processing modules 14 to 17. For example, the unit U3 may be provided in the shelf unit U10 or the shelf unit U11.

(12) The substrate inspection unit 100 (the substrate inspection apparatus) may be accommodated in a separate casing from the controller 10, and may be configured as a separate computer (a circuit) from the controller 10. The substrate inspection unit 100 may be configured by a computer or a server device that may be connected to the coating developing device 2 from outside. As described above, the substrate inspection unit 100 does not need to be configured integrally with the coating developing device 2 or the controller 10, and may be realized as an external device that may be connected by wired or wireless communication as necessary.

Figure 21:
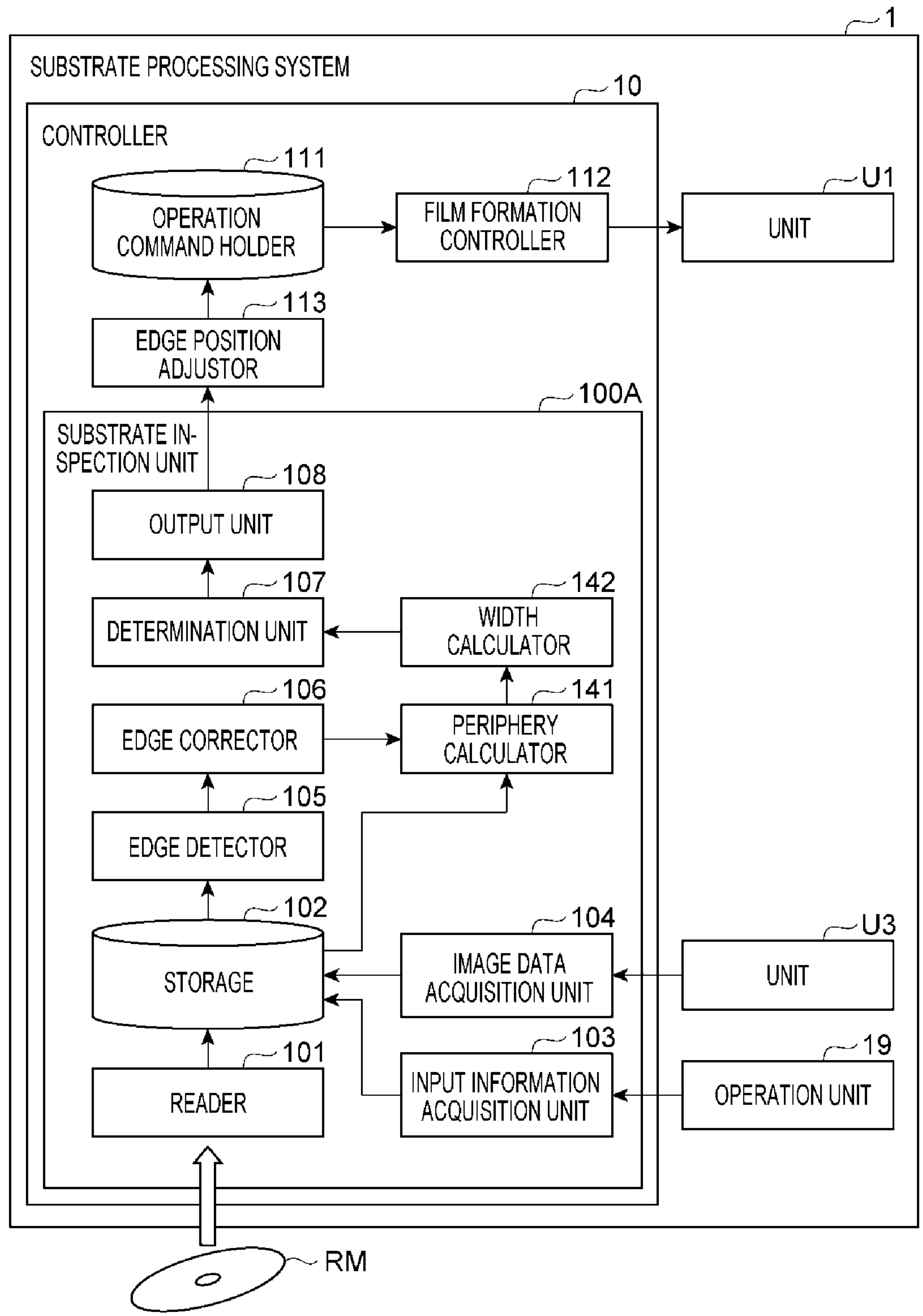
FIG. 21 is a block diagram illustrating another example of the main portion of the substrate processing system.

(13) In another example of the substrate processing system 1 (the substrate processing apparatus), as illustrated in FIG. 21, the controller 10 may include a substrate inspection unit 100A (a substrate inspection apparatus) instead of the substrate inspection unit 100. The substrate inspection unit 100A is different from the substrate inspection unit 100 in that the substrate inspection unit 100A further includes a periphery calculator 141 and a width calculator 142 as function modules.

The periphery calculator 141 is configured to calculate a theoretical periphery position of the wafer W. The theoretical periphery of the wafer W is a theoretical periphery based on a design dimension of the radius (the diameter) of the wafer W (hereinafter, referred to as a "theoretical periphery"), unlike an actual periphery of the wafer W. In some cases, an actual dimension between the center and the actual periphery WE in the wafer W is different from the design dimension due to, for example, an individual difference of the wafer W itself, or an error in processing the peripheral portion of the wafer W, and a deviation may occur in the position of the actual periphery WE between wafers W. The theoretical periphery is a virtual periphery that is not affected by the deviation between the wafers W in a distance between the center and the actual periphery WE (the position of the periphery WE).

The periphery calculator 141 is configured to calculate position data of a theoretical periphery on image data, as a position of the theoretical periphery. The position of the theoretical periphery is indicated by, for example, coordinates of a pixel from the origin of the image data. The periphery calculator 141 may be configured to calculate the position of the theoretical periphery in the inspection target wafer W on the basis of a wafer (hereinafter, referred to as a "reference wafer W0") used for calculating the position of the theoretical periphery. The periphery calculator 141 may be configured to calculate, for example, the position of the theoretical periphery of the reference wafer W0, which is obtained with respect to the center of the reference wafer W0 (the reference substrate), as the position of the theoretical periphery in the inspection target wafer W. An identification element (for example, a pattern or a scale) for identifying a distance from the center of the reference wafer W0 may be formed on the front surface of the reference wafer W0. The periphery calculator 141 may be configured to calculate the position of the theoretical periphery by using the identification element on the front surface of the reference wafer W0.

As an example, the periphery calculator 141 may be configured to execute a first processing of calculating position data of a reference position RP (see FIGS. 23A and 23B) preset on the reference wafer W0 on the basis of image data obtained from a captured image of the periphery of the reference wafer W0 (hereinafter, referred to as "reference image data"). The storage 102 may store the reference image data acquired by the image data acquisition unit 104, and the periphery calculator 141 may be configured to execute the first processing on the basis of the reference image data stored in the storage 102. The periphery calculator 141 may be configured to execute a second processing of calculating a difference (hereinafter, referred to as a "difference value") between a design dimension of a radius of the wafer W, and a distance from the center of the reference wafer W0 to the reference position RP. The periphery calculator 141 may be configured to execute a third processing of calculating position data of a theoretical periphery on the basis of the position data of the reference position RP and the difference value. Hereinafter, the position data of the theoretical periphery calculated by executing the first to third processings is referred to as "position data of a first theoretical periphery WEr1." The reference wafer W0 may be a separate wafer from the inspection target wafer W, or may be one of the inspection target wafers W.

The periphery calculator 141 may be configured to execute a fourth processing of calculating position data of the periphery WE of the wafer W (position data of an actual periphery) on the basis of inspection image data for detecting target edges (the edges E1 to E3) of the inspection target wafer W. The periphery calculator 141 may be configured to execute the fourth processing on the basis of the inspection image data stored in the storage 102. The periphery calculator 141 may be configured to execute a fifth processing of calculating the eccentric state of the wafer W, on the basis of the position data of the periphery WE of the wafer W calculated in the edge corrector 106. The position data of the periphery WE of the wafer W, which is calculated in the edge corrector 106, may be one obtained by correcting the position data of the periphery WE obtained in the edge detector 105. The periphery calculator 141 may be configured to execute a sixth processing of calculating position data of a separate theoretical periphery by correcting the position data of the first theoretical periphery WEr1 in consideration of the eccentric state of the wafer W. Hereinafter, the position data of the separate theoretical periphery calculated by executing the fourth to sixth processings is referred to as "position data of a second theoretical periphery WEr2."

The width calculator 142 is configured to calculate a width (a removal width) between the theoretical periphery and the target edge, on the basis of the position data of the theoretical periphery obtained in the periphery calculator 141 and the position data of the target edge obtained in the edge detector 105. The width calculator 142 may be configured to calculate, for example, the removal width according to the interval (the number of pixels) between the position data of the first theoretical periphery WEr1 and the position data of the target edge on the image.

The width calculator 142 may be configured to calculate the removal width according to the interval (the number of pixels) between the position data of the second theoretical periphery WEr2 and the position data of the target edge on the image. The width calculator 142 may be configured to calculate the width (the removal width) between the periphery WE of the wafer W and the target edge on the basis of the position data of the periphery WE of the wafer W obtained in the periphery calculator 141 and the position data of the target edge obtained in the edge detector 105. The width calculator 142 may be configured to output the calculated removal width to the determination unit 107. The determination unit 107 may be configured to determine the state of the target edge on the basis of the removal width obtained in the width calculator 142.

Figure 22:
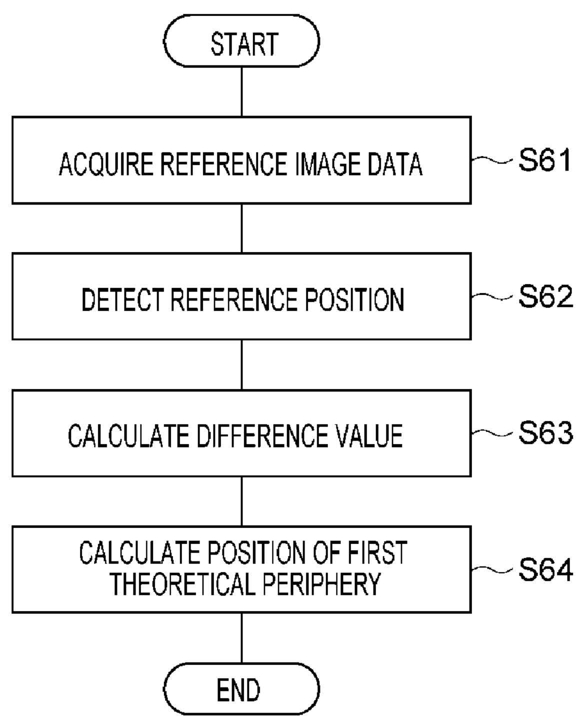
FIG. 22 is a flowchart illustrating an example of a calculation processing of a theoretical periphery.

Next, descriptions will be made on a substrate processing method including an edge inspection processing, which is executed in another example of the substrate processing system 1. First, descriptions will be made on a preparation process for performing edge inspection, with reference to FIG. 22. The preparation process may be executed prior to the process of steps S11 to S18 illustrated in FIG. 10, or may be executed in parallel to steps S11 to S16 or after the process of steps S11 to S16.

Figure 23A:
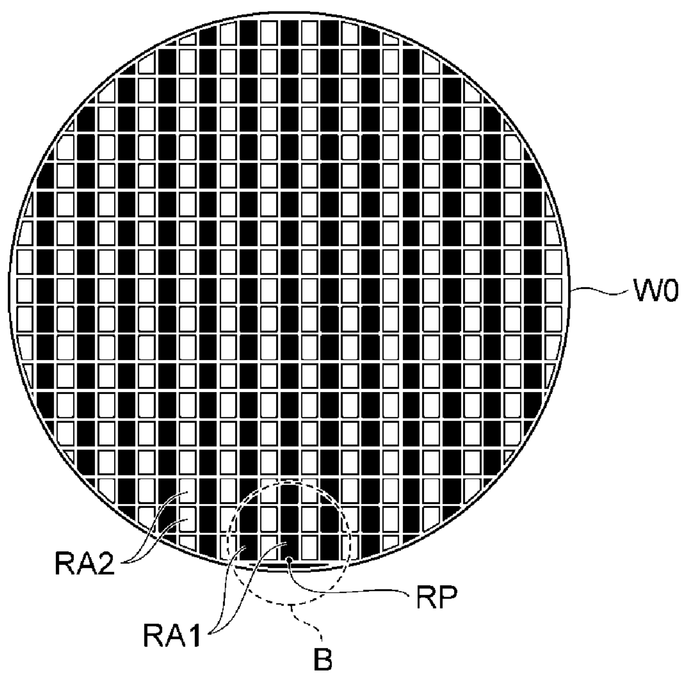
FIG. 23A is a schematic view illustrating an example of a pattern formed on a front surface of a reference substrate.
Figure 23B:
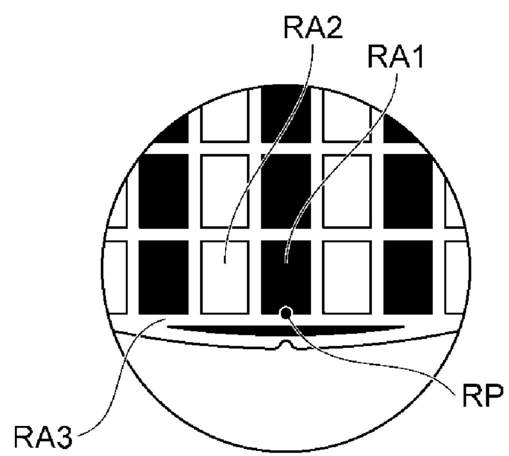
FIG. 23B is a schematic view of a B portion in FIG. 23A, in an enlarged scale.
Figure 24:
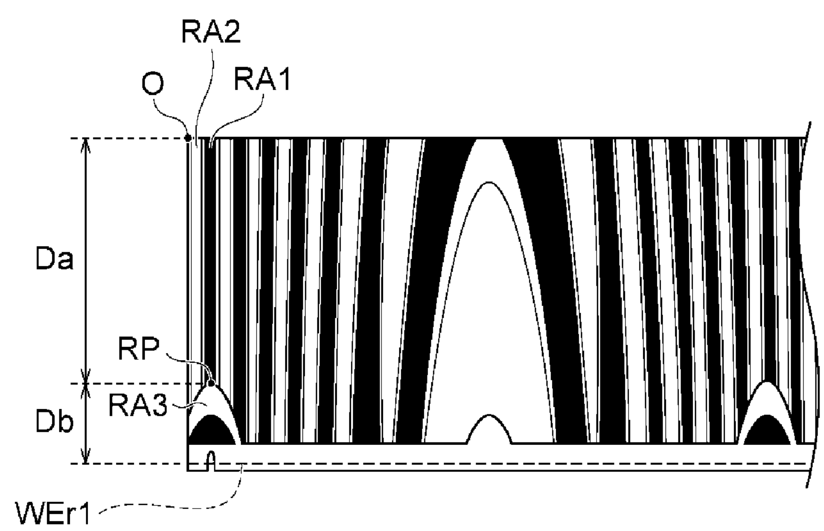
FIG. 24 is a schematic view illustrating an example of a captured image of a periphery of the reference substrate.

In the preparation process, the controller 10 controls the unit U3 so as to acquire reference image data (step S61). In step S61, for example, the image data acquisition unit 104 acquires captured image data generated by imaging the periphery of the reference wafer W0, as the reference image data. FIGS. 23A and 23B illustrate an example of the reference wafer W0, and FIG. 24 illustrates an example of a captured image obtained by imaging the periphery of the reference wafer W0. FIG. 23B illustrates a view of a partial region B including a notch of the reference wafer W0 illustrated in FIG. 23A, in an enlarged scale.

For example, as illustrated in FIGS. 23A and 23B, a pattern including regions RA1 to RA3 having different refractive indices is formed, as an identification element, on the front surface of the reference wafer W0. That is, on the captured image, color information (an RGB value) differs between the regions RA1 to RA3. The number of regions having different refractive indices may be two or four or more, and the pattern may be formed by any unit as long as the RGB value differs between two or more regions.

In the example illustrated in FIGS. 23A and 23B, due to a difference between, for example, circuit patterns formed within regions, a difference in a refractive index is formed between the regions. A plurality of regions RA1 and a plurality of regions RA2 are regularly arranged over most of the front surface. Specifically, the regions RA1 and RA2 are formed on the front surface such that each of the plurality of regions RA1 and the plurality of regions RA2 is arranged in one direction (a sheet vertical direction), and the regions RA1 and the regions RA2 are alternately arranged in a direction (a sheet horizontal direction) orthogonal to one direction. The region RA3 is formed in a lattice shape while surrounding each region RA1 and each region RA2. The region RA3 is a region where, for example, a circuit pattern is not formed on the front surface.

The image data acquisition unit 104 may acquire the captured image data (the reference image data) obtained by imaging the above described reference wafer W0 by, for example, the periphery imaging subunit 80 of the unit U3. The captured image of the periphery illustrated in FIG. 24 also illustrates the regions RA1 to RA3. The image data acquisition unit 104 outputs the acquired reference image data to the storage 102, and the storage 102 stores the reference image data.

Next, the controller 10 executes a first processing of calculating position data of a reference position RP preset on the reference wafer W0 (step S62). In step S62, for example, the periphery calculator 141 calculates the position data of the reference position RP on the basis of the reference image data stored in the storage 102. The reference position RP is a position set in advance by, for example, the operator, at which an actual distance from the center of the reference wafer W0 is known. As illustrated in FIGS. 23A and 23B, the reference position RP may be set at a boundary between the region RA1 and the region RA3 located near the notch provided in the periphery of the wafer W. The periphery calculator 141 detects the position (the pixel value) of the reference position RP on the image by sequentially calculating contrast ratios from, for example, the top, in a vertical pixel group including the notch on the reference image data. The periphery calculator 141 calculates extracted vertical coordinates of the reference position RP, with respect to, for example, the upper left corner (as the origin O) of the reference image data on the sheet, as the position data of the reference position RP (an interval Da [pixel] between the origin O and the reference position RP on the image).

Next, the controller 10 executes a second processing of calculating a difference value between a design dimension of a radius of the wafer W, and the actual distance from the center at the reference position RP (step S63). The design dimension of the radius of the wafer W and the actual distance from the center at the reference position RP are known values, and are stored in advance, in the storage 102 by, for example, the operator. As an example, when the design dimension of the radius of the wafer W is 150 mm, and the design position (the known distance) from the center at the reference position RP is 145 mm, the periphery calculator 141 calculates the difference value as 5 mm.

Next, the controller 10 executes a third processing of calculating position data of the first theoretical periphery WEr1 (step S64). In step S64, for example, the periphery calculator 141 calculates position data of the first theoretical periphery WEr1 on the basis of the interval Da indicating the position of the reference position RP, and the difference value. The periphery calculator 141 calculates an interval db [pixel] on the image corresponding to the difference value by dividing the difference value obtained in step S63 by the size per pixel [mm/pixel] as illustrated in FIG. 24. The size per pixel is a known value determined according to, for example, set values and arrangement of optical system components in the unit U3. Then, the periphery calculator 141 calculates the position data of the first theoretical periphery WEr1 by adding the interval Da corresponding to the position of the reference position RP, and the interval db corresponding to the difference value. The periphery calculator 141 calculates the addition value of the interval Da and the interval db, as the position data of the first theoretical periphery WEr1, at all measurement positions (angles) in the circumferential direction.

By executing the above steps S62 to S64, the periphery calculator 141 calculates the position of the first theoretical periphery WEr1 in the reference wafer W0. The periphery calculator 141 outputs, for example, the position data of the first theoretical periphery WEr1 to the storage 102, and the storage 102 stores the position data of the first theoretical periphery WEr1. The position data of the first theoretical periphery WEr1 obtained by executing steps S62 to S64 may be used as the position data of the first theoretical periphery WEr1 not only in the reference wafer W0, but also in a captured image of the peripheral portion of the inspection target wafer W, which is imaged in the unit U3. That is, the periphery calculator 141 may calculate the theoretical periphery position of the reference wafer W0, as the theoretical periphery position of the inspection target wafer W.

Figure 25:
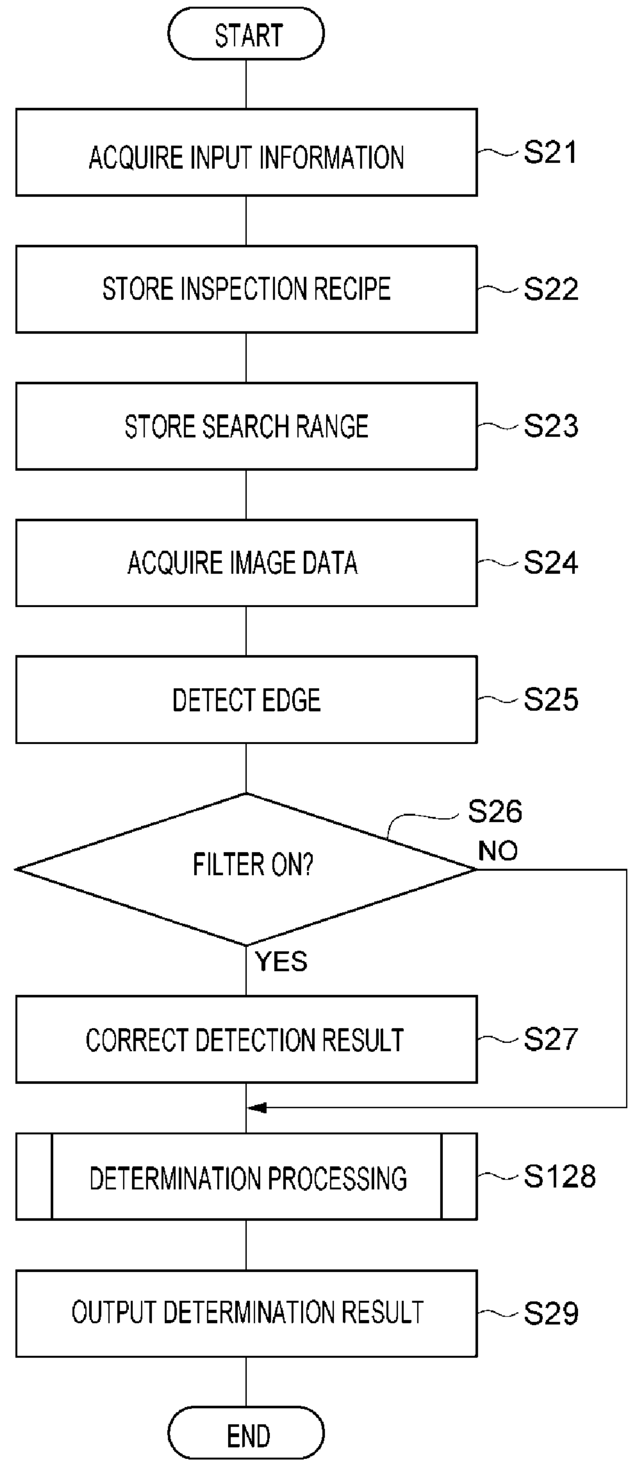
FIG. 25 is a flowchart illustrating an example of an edge inspection processing.
Figure 26:
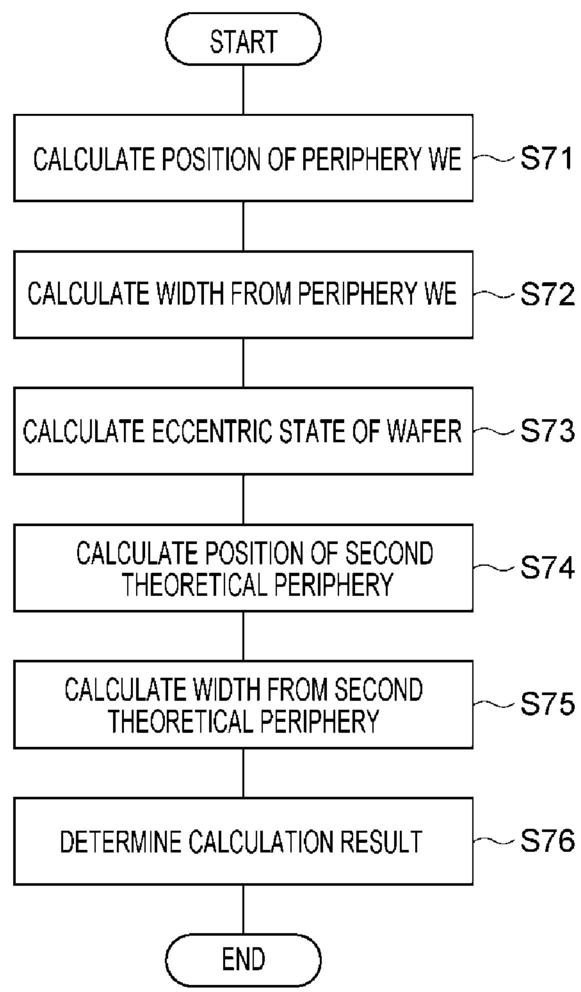
FIG. 26 is a flowchart illustrating an example of a determination processing of a detection result.

Next, the controller 10 executes steps S11 to S16 illustrated in FIG. 10. Then, the controller 10 executes the edge inspection processing illustrated in FIG. 25 instead of the edge inspection processing illustrated in FIG. 14, during the edge inspection processing in step S17. The edge inspection method illustrated in FIG. 25 is different from the edge inspection processing of FIG. 14, in that a determination processing in step S128 instead of step S28 is executed. An example of the determination processing in step S128 will be described below with reference to FIG. 26.

Figure 27:
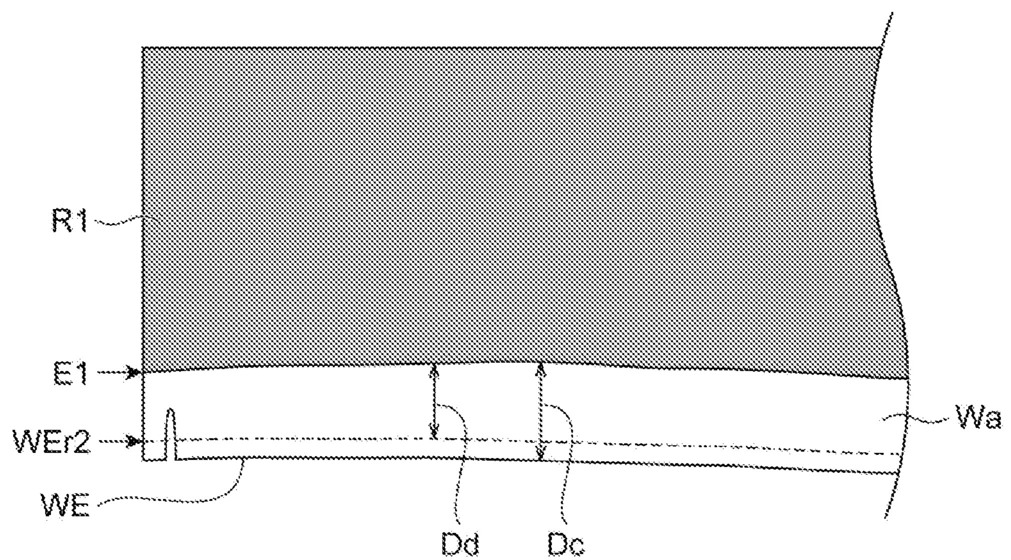
FIG. 27 is a view for explaining a calculation example of a width between a periphery and a target edge.

In this determination processing, first, the controller 10 executes a fourth processing of calculating position data of the periphery WE of the wafer W as an inspection target (step S71). In step S71, for example, the periphery calculator 141 calculates the position data of the periphery WE of the wafer W on the basis of inspection image data stored in the storage 102. As illustrated in FIG. 27, for example, the periphery calculator 141 detects the position of the periphery WE by sequentially calculating contrast ratios between adjacent pixels in a vertical pixel group at each of measurement positions (for example, 360 points) in the circumferential direction of the wafer W. The periphery calculator 141 detects, for example, coordinates having a contrast ratio equal to or larger than a predetermined value in the vertical pixel group, and calculates the coordinates as the position data of the periphery WE.

Next, the controller 10 calculates a removal width between the periphery WE detected in step S71 and a target edge (step S72). In step S72, as illustrated in FIG. 27, for example, the width calculator 142 calculates an interval Dc [pixel] on the image, on the basis of a difference between the position data of the periphery WE and the position data of the target edge (for example, the edge E1), at each of the measurement positions of the wafer W. Then, the width calculator 142 calculates the removal width between the periphery WE and the target edge by multiplying the interval Dc by the size per pixel [mm/pixel]. This removal width corresponds to the position of the target edge from the actual periphery WE.

Next, the controller 10 executes a fifth processing of calculating the eccentric state of the inspection target wafer W (step S73). In step S73, for example, the periphery calculator 141 calculates the degree of eccentricity with respect to the center of the first theoretical periphery WEr1 on the basis of the position data of the periphery WE of the wafer W. The periphery calculator 141 may calculate an eccentric amount (A) and an eccentric angle ($\alpha$) of the periphery WE with respect to the center of the first theoretical periphery WEr1 according to a known method. As an example, the periphery calculator 141, first, calculates differences L0, L90, L180, and L270 between the position data of the first theoretical periphery WEr1 and the position data of the periphery WE, at four portions of 0°, 90°, 180° and 270°, respectively in the circumferential direction of the wafer W, among the plurality of measurement positions (measurement angles (θ)). Then, when eccentricities (t, u) are defined as $$t=(L90-L270)/2, \text{ and}$$

$$u=(L180-L0)/2, \text{ respectively,}$$

the periphery calculator 141 calculates the eccentric amount (A) and the eccentric angle (α) according to the following equations 1 and 2. The periphery calculator 141 may calculate the eccentric amount (A) and the eccentric angle (α) by including a position shifted from 0° by a predetermined angle, in further consideration of differences at four measurement positions separated from each other at 90° intervals.

$$A=(t^2+u^2)^{1/2} \quad (1)$$

$$\alpha=\tan^{-1}(t/u) \quad (2)$$

Next, the controller 10 executes a sixth processing of calculating position data of the second theoretical periphery WEr2 (step S74). In step S74, for example, the periphery calculator 141 calculates the position data of the second theoretical periphery WEr2 on the basis of the position data of the first theoretical periphery WEr1 in consideration of the eccentric state of the wafer W calculated in step S73. As an example, when the position data of the first theoretical periphery WEr1 is represented by "WE1(θ)" as a function of an angle (θ) in the circumferential direction of the wafer W, and the position data of the second theoretical periphery WEr2 is represented by "WE2(θ)" as a function of an angle (θ) in the circumferential direction of the wafer W, the periphery calculator 141 calculates the position data of the second theoretical periphery WEr2 according to the following equation 3.

$$WE2(\theta)=A\sin(\theta+\alpha)+WE1(\theta) \quad (3)$$

Next, the controller 10 calculates a removal width between the second theoretical periphery WEr2 and the target edge (step S75). In step S75, as illustrated in FIG. 27, for example, the width calculator 142 calculates an interval Dd [pixel] on the image, on the basis of a difference between the position data of the second theoretical periphery WEr2 and the position data of the target edge at each of the measurement positions of the wafer W. Then, the width calculator 142 calculates the removal width between the second theoretical periphery WEr2 and the target edge by multiplying the interval Dd by the size per pixel [mm/pixel]. This removal width corresponds to the position of the target edge from the theoretical periphery, unlike the removal width calculated in step S72 (corresponds to the position of the target edge with respect to the center of the wafer W).

Next, the controller 10 determines the state of the target edge on the basis of the removal width (step S76). In step S76, the determination unit 107 may determine, for example, whether the removal width (the average removal width) calculated in step S72 falls within an allowable range. The determination unit 107 may determine, for example, whether the removal width calculated in step S72 is present in a range in which a relative position adjustment to be described below is required. The determination unit 107 may determine whether the removal width (the average removal width) calculated in step S75 falls within an allowable range. The determination unit 107 may determine, for example, whether the removal width calculated in step S75 is present in a range in which a relative position adjustment to be described below is required. The determination unit 107 outputs the determination result to the output unit 108.

Referring back to FIG. 25, the controller 10 (the output unit 108) outputs the determination result in step S76, in step S29 after execution of step S128. For example, when the removal width based on the second theoretical periphery WEr2 calculated in step S74 falls within a range in which adjustment is required, the output unit 108 may output a signal indicating that adjustment is required, to the edge position adjustor 113. In this case, the edge position adjustor 113 may adjust the formation condition (for example, location information of the nozzle 44) of a target edge such as the edge E1 in step S12 to be performed on a subsequent wafer W to be processed after the inspection target wafer W.

The edge position adjustor 113 may adjust a relative position between the nozzle 44 and the wafer W held by the rotation holder 20, such that the removal width of the target edge (on the basis of the second theoretical periphery WEr2) to be formed on the subsequent wafer W approaches a target value, on the basis of the calculation result of the removal width in step S75. For example, when receiving a signal indicating that the removal width based on the second theoretical periphery WEr2 needs to be adjusted, the edge position adjustor 113 may calculate an adjustment value according to a deviation between the removal width calculated in step S75 and the target value. The edge position adjustor 113 may correct application conditions held in the operation command holder 111 (for example, location information of the nozzle 44, and information on a position where the wafer W is held by the rotation holder 20) according to the calculated adjustment value. Accordingly, a film including the target edge in a state where the removal width between the second theoretical periphery WEr2 and the target edge is adjusted may be formed on the subsequent wafer W (the separate substrate).

Also, in another example of the substrate processing system 1 including the substrate inspection unit 100A, as described above, similarly to the example of the substrate processing system 1 including the substrate inspection unit 100, it is possible to more securely detect an inspection target edge among a plurality of edges, from inspection image data.

In another example described above, the substrate inspection unit 100A further includes the periphery calculator 141 configured to calculate a position of a theoretical periphery of the wafer W, and the width calculator 142 configured to calculate a width between the theoretical periphery and a target edge on the basis of position data of the theoretical periphery obtained in the periphery calculator 141 and position data of the target edge obtained in the edge detector 105. The position of the theoretical periphery is not affected by a deviation between radius sizes of wafers W. In the above configuration, since a removal width between the periphery and the target edge is calculated on the basis of the position of the theoretical periphery, the size of a film including the target edge may be easily adjusted without being affected by the deviation between the radial sizes of the wafers W.

In another example described above, the periphery calculator 141 is configured to calculate the position of a theoretical periphery of the reference wafer W0 obtained with respect to the center of the reference wafer W0, as the position of the theoretical periphery. In this case, the above removal width is obtained in consideration of the theoretical periphery of the wafer W with respect to the center of the reference wafer W0. Thus, the position of a target edge with respect to the center of the wafer W may be easily adjusted without being affected by the deviation between the radial sizes of the wafers W.

In another example described above, the periphery calculator 141 is configured to execute a processing of calculating position data of a reference position RP preset on the reference wafer W0 on the basis of reference image data obtained from a captured image of the periphery of the reference wafer W0, a processing of calculating a difference value between a design dimension of a radius of the wafer W, and a distance from the center of the reference wafer W0 to the reference position RP, and a processing of calculating position data of a theoretical periphery WEr1 on the basis of the position data of the reference position RP and the theoretical width. In this configuration, even if the center of the reference wafer W0 is not included in the reference image data, it is possible to calculate the position data of the theoretical periphery WEr1 with respect to the center.

In another example described above, the periphery calculator 141 is configured to execute a processing of calculating position data of a periphery WE of the wafer W on the basis of inspection image data, a processing of calculating the eccentric state of the wafer W on the basis of the position data of the periphery WE of the wafer W, and a processing of calculating position data of a theoretical periphery WEr2 in consideration of the eccentric state of the wafer W. In this case, it is possible to calculate a removal width between the position of the theoretical periphery and the position of a target edge in consideration of the eccentric state of the wafer W as a detection target. That is, it is possible to further improve a calculation accuracy of the removal width.

In another example described above, the periphery calculator 141 is configured to calculate position data of a periphery WE of the wafer W on the basis of inspection image data. The width calculator 142 is configured to calculate a width between the periphery WE of the wafer W and a target edge on the basis of position data of the periphery WE of the wafer W obtained in the periphery calculator 141 and position data of the target edge obtained in the edge detector 105. In this case, since it is possible to calculate a removal width between an actual periphery and the target edge as well as a removal width between a theoretical periphery and the target edge, it is possible to increase options for a calculation method.

Figure 28A:
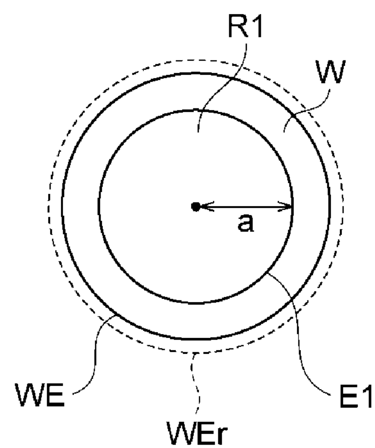
FIGS. 28A to 28C are views for explaining an example of a process adjustment based on a width between a theoretical periphery and a target edge.
Figure 28B:
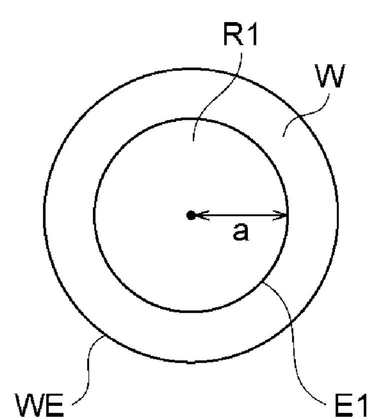
Figure 28C:
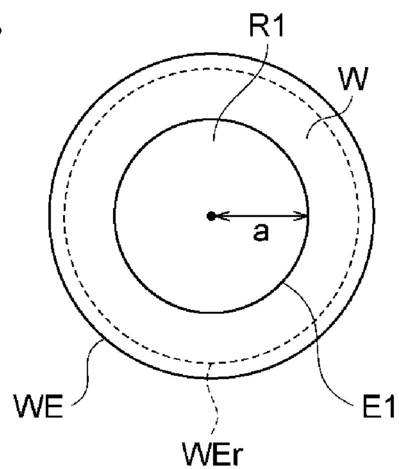

FIGS. 28A to 28C illustrate an example of a formation range of a film in a case where an actual radius dimension of a wafer W varies, when a relative position between the nozzle 44 and the wafer W is adjusted such that a removal width based on a theoretical periphery approaches a target value. FIG. 28A illustrates a case where an actual radius r of the wafer W is smaller than a design dimension (a design value R0), FIG. 28B illustrates a case where the radius r is equal to the design value R0, and FIG. 28C illustrates a case where the radius r is larger than the design value R0. In FIGS. 28A to 28C, the theoretical periphery is represented by "WEr," while in FIG. 28B, illustration of the theoretical periphery WEr is omitted because the radius r is equal to the design value R0, and the theoretical periphery WEr overlaps the periphery WE of the wafer W. The theoretical periphery WEr is set at the same position regardless of the size of the radius r.

Since the relative position between the nozzle 44 and the wafer W is adjusted such that the width between the theoretical periphery WEr and a target edge (for example, the edge E1) approaches the target value, a position of the target edge from the theoretical periphery WEr is adjusted to a substantially constant value. That is, an actual radius a of the film from the center of the wafer W is adjusted to a substantially constant value regardless of the size of the actual radius r of the wafer W (even if the radius r includes an error). As described above, by adjusting the position of the target edge from the theoretical periphery WEr, to a substantially constant value, the size (area) of a film including the target edge may be adjusted to be substantially constant without being affected by a deviation of sizes of radiuses r between the wafers W.

(14) In another example described above, adjusting a film size to be substantially constant on the basis of a theoretical periphery is possible even in a case where an edge is detected on the wafer W on which a single edge (a single film) is formed. For example, the controller 10 may execute an edge inspection processing before executing step S13 after executing steps S11 and S12 in FIG. 10. In this edge inspection processing, the controller 10 may detect one target edge (the edge E1) on the basis of a contrast ratio without using. For example, an inspection recipe. Then, the controller 10 may adjust a removal width in a subsequent wafer W by calculating a removal width between the edge E1 and the theoretical periphery.

(15) When an inspection target wafer W is used as the reference wafer W0, the controller 10 may perform a preparation process of steps S61 to S64 after executing step S16 in FIG. 10 (after an exposure processing), for example, in a processing on a first inspection target wafer W. In this case, the controller 10 (the periphery calculator 141) may omit step S61, and use inspection image data as reference image data. In step S62, the periphery calculator 141 may use a specific portion of a processing result in the exposure processing, as a reference position RP. The controller 10 may perform the processing in step S128 by setting a position on the image determined in advance by, for example, the operator, as a position of the first theoretical periphery WEr1, without performing the preparation process.

(16) In another example described above, the width calculator 142 calculates a removal width between the second theoretical periphery WEr2 and a target edge, but may calculate a removal width between the first theoretical periphery WEr1 and the target edge without taking eccentricity into consideration. In this case, the width calculator 142 may omit the process of steps S73 to S75, which includes calculation of the second theoretical periphery WEr2. The controller 10 may adjust a relative position between the nozzle 44 and the wafer W (location information of the nozzle 44) such that the removal width based on the first theoretical periphery WEr1 approaches a target value.

(17) In another example described above, in step S128, the periphery calculator 141 performs calculation of a removal width based on the periphery WE and calculation of a removal width based on the second theoretical periphery WEr2, but may omit calculation of the removal width based on the periphery WE. When the periphery calculator 141 is configured to execute calculation of the above two removal widths, information indicating a calculation method of the removal width may be input by, for example, the operator. According to the above input information, the periphery calculator 141 may execute either calculation of the removal width based on the periphery WE or calculation of the removal width based on the second theoretical periphery WEr2 (the first theoretical periphery WEr1).

EXAMPLES

Example 1. A substrate inspection apparatus according to an example of the present disclosure includes: a storage 102 configured to store inspection image data obtained from a captured image of a periphery Wd of a substrate W on which a plurality of films R1 to R3 is formed, and an inspection recipe IR1 to IR3; and an edge detector 105 configured to detect a target edge E1 to E3 as an edge of an inspection target film among the films R1 to R3 on the basis of the inspection image data stored in the storage 102 by using the inspection recipe IR1 to IR3 stored in the storage 102. Each of edges E1 to E3 of the films R1 to R3 extends along the periphery WE of the substrate W. The inspection recipe IR1 to IR3 is configured by combining parameters each of which has one option specified among a plurality of options. In this case, since an inspection recipe is configured by a combination of options of parameters, it is possible to configure an inspection recipe proper for a target edge. That is, when inspection image data includes a plurality of edges, it is possible to set an inspection recipe having a combination of parameters by which only a target edge is detectable. As a result, it is possible to more securely detect an inspection target edge among a plurality of edges from inspection image data.

Example 2. In the substrate inspection apparatus of Example 1, the inspection recipe IR1 to IR3 may be configured by combining the parameters each of which has the one option specified by an operation input from an operator. In this case, the inspection recipe is configured by combining parameters which are specified after the operator performed a trial of target edge detection. Thus, it is possible to configure an inspection recipe by which a target edge is more securely detectable among a plurality of edges from inspection image data.

Example 3. In the substrate inspection apparatus of Example 1 or Example 2, the storage 102 may be configured to store a detection region preset as a region in which edge detection by the edge detector 105 is performed, and the edge detector 105 may be configured to detect a portion in the target edge E1 to E3 located within the detection region by using the inspection recipe IR1 to IR3 and the detection region stored in the storage 102. In this case, a specific portion in a target edge is detected according to a preset detection region. Thus, it is possible to adjust a portion to be detected in the target edge.

Example 4. The substrate inspection apparatus of Example 1 or Example 2 may further include an edge corrector 106. In the substrate inspection apparatus, the storage 102 may be configured to store a detection region preset as a region in which edge detection by the edge detector 105 is performed. The edge corrector 106 may be configured to perform a correction processing of excluding data outside the detection region, from a detection result obtained by the edge detector 105. In this case, in a detection result corrected by the edge corrector, a portion in a target edge located outside a detection region is excluded. Thus, it is possible to adjust a portion to be detected in the target edge.

Example 5. The substrate inspection apparatus of any one of Examples 1 to 4 may further include an edge corrector 106 configured to perform a correction processing of calculating a difference between a reference line calculated by smoothing a data sequence of the target edge E1 to E3 detected by the edge detector 105, and each data piece included in the data sequence, and excluding a data piece in which the difference is larger than a predetermined threshold from data pieces. In this case, in a detection result corrected by the edge corrector, abnormal data whose difference is larger than the threshold is excluded from an edge detection result. Thus, it is possible to detect a target edge with higher accuracy.

Example 6. In the substrate inspection apparatus of any one of Examples 1 to 5, the films R1 and R2 may include a pre-step film R1 formed prior to the inspection target film R2. The storage 102 may be configured to store pre-step image data obtained by imaging the periphery Wd of the substrate W before formation of the inspection target film R2 after formation of the pre-step film R1. The edge detector 105 may be configured to detect the target edge E2 by comparing information indicating each of the edges E1 and E2 of the films R1 and R2 included in the inspection image data and information indicating an edge E1 of the pre-step film R1 included in the pre-step image data. In this case, it is possible to remove information of the edge of the pre-step film, which is indicated by the inspection image data, or information of the edge of the pre-step film, which is included in the detection result obtained from the inspection image data, through the difference processing. Thus, even when a pre-step edge is formed close to a target edge, it is possible to detect the target edge with higher accuracy.

Example 7. In the substrate inspection apparatus of any one of Examples 1 to 6, the storage 102 may be configured to store a search range SR1 to SR3 that defines a range in which a search for the target edge E1 to E3 in an intersecting direction that intersects with the edges E1 to E3 of the films R1 to R3 included in the captured image is performed. The edge detector 105 may be configured to detect the target edge E1 to E3 within the search range SR1 to SR3 on the basis of the inspection image data and the search range SR1 to SR3 stored in the storage 102 by using the inspection recipe IR1 to IR3 stored in the storage 102. A size of the search range SR1 to SR3 may be set according to a variation range of the target edge E1 to E3 in the intersecting direction. In this case, on the inspection image data, even if there is an edge whose change amount of a contrast ratio is equal to or larger than a predetermined threshold, in addition to a target edge, since a search is performed in a search range based on a variation range of the target edge, only the target edge may be detected. Thus, it is possible to detect a target edge from inspection image data without detecting edges other than the target edge among a plurality of edges.

Example 8. In the substrate inspection apparatus of any one of Examples 1 to 7, the parameters may include at least one selected from a group including a conversion parameter indicating a conversion condition for converting color attributes of the inspection image data, a search direction parameter indicating a direction in which a search for the target edge E1 to E3 is performed, a priority parameter indicating a priority for selecting the target edge which is one out of the edges E1 to E3 of the films R1 to R3, and a filter parameter indicating whether to use filtering for removing an influence of a disturbance included in the target edge E1 to E3. In this case, it is possible to configure an inspection recipe according to the feature of a target edge among a plurality of edges.

Example 9. The substrate inspection apparatus of any one of Examples 1 to 8 may further include a periphery calculator 141 configured to calculate a position of a theoretical periphery WEr1, WEr2 of the substrate W; and a width calculator 142 configured to calculate a width Dd between the theoretical periphery WEr1, WEr2 of the substrate W and the target edge E1 to E3 on the basis of position data of the theoretical periphery WEr1, WEr2 of the substrate W obtained in the periphery calculator 141 and position data of the target edge E1 to E3 obtained in the edge detector 105. In this case, the width is obtained in consideration of the theoretical periphery of the substrate. Thus, the size of a film including the target edge may be easily adjusted without being affected by the deviation between the radial sizes of the substrates.

Example 10. In the substrate inspection apparatus of Example 9, the periphery calculator 141 may be configured to calculate a position of a theoretical periphery of a reference substrate W0 obtained with respect to a center of the reference substrate W0, as the position of the theoretical periphery WEr1, WEr2 of the substrate W. In this case, the width is obtained in consideration of the theoretical periphery of the substrate with respect to the center of the reference substrate. Thus, the position of a target edge with respect to the center of the substrate may be easily adjusted without being affected by the deviation between the radial sizes of the substrates.

Example 11. In the substrate inspection apparatus of Example 10, the periphery calculator 141 may be configured to execute a processing of calculating position data of a reference position RP preset on the reference substrate W0 on the basis of reference image data obtained from a captured image of a periphery of the reference substrate W0, a processing of calculating a difference db between a design dimension of a radius of the substrate W, and a distance from the center of the reference substrate W0 to the reference position RP, and a processing of calculating position data of the theoretical periphery of the reference substrate W0 on the basis of the position data of the reference position RP and the difference db. In this case, even if the center of the reference substrate is not included in the reference image data, it is possible to calculate the position of the theoretical periphery with respect to the center.

Example 12. In the substrate inspection apparatus of any one of Examples 9 to 11, the periphery calculator 141 may be configured to execute a processing of calculating position data of the periphery WE of the substrate W on the basis of the inspection image data, a processing of calculating an eccentric state of the substrate W on the basis of the position data of the periphery WE of the substrate W, and a processing of calculating the position data of the theoretical periphery WEr2 of the substrate W in consideration of the eccentric state of the substrate W. In this case, it is possible to calculate a width between the theoretical periphery of the substrate and a target edge in consideration of the eccentric state of the substrate as a detection target.

Example 13. In the substrate inspection apparatus of any one of Examples 9 to 12, the periphery calculator 141 may be configured to calculate position data of the periphery WE of the substrate W on the basis of the inspection image data. The width calculator 142 may be configured to calculate a width Dc between the periphery WE of the substrate W and the target edge E1 to E3 on the basis of the position data of the periphery WE of the substrate W obtained in the periphery calculator 141, and the position data of the target edge E1 to E3 obtained in the edge detector 105. In this case, since it is possible to calculate a width between an actual periphery of the substrate and the target edge as well as a width between a theoretical periphery of the substrate and the target edge, it is possible to increase options for a calculation method.

Example 14. A substrate processing apparatus according to an example of the present disclosure includes: a film forming unit U14 to U16 configured to form a plurality of films R1 to R3 on a substrate W; an imaging unit U3 configured to acquire a captured image by imaging a periphery Wd of the substrate W; and a controller 10 configured to inspect a target edge E1 to E3 as an edge of an inspection target film among the films R1 to R3. The controller 10 includes: a storage 102 configured to store inspection image data obtained from the captured image, and an inspection recipe IR1 to IR3; and an edge detector 105 configured to detect the target edge E1 to E3 on the basis of the inspection image data stored in the storage 102 by using the inspection recipe IR1 to IR3 stored in the storage 102. Each of edges of the films R1 to R3 extends along the periphery WE of the substrate W. The inspection recipe IR1 to IR3 is configured by combining parameters each of which has one option specified among a plurality of options. In this case, in the same manner as described above, for inspection image data including a plurality of edges, it is possible to set an inspection recipe having a combination of parameters by which only a target edge is detectable. As a result, it is possible to more securely detect an inspection target edge among a plurality of edges from inspection image data.

Example 15. A substrate processing apparatus according to an example of the present disclosure includes: a film forming unit U14 to U16 configured to form a plurality of films R1 to R3 on a substrate W; an imaging unit U3 configured to acquire a captured image by imaging a periphery Wd of the substrate W; and a controller 10 configured to inspect a target edge E1, E2 as an edge of an inspection target film R1, R2 among the films R1 to R3. The controller 10 includes: a storage 102 configured to store inspection image data obtained from the captured image, a first inspection recipe IR1, and a second inspection recipe IR2; and an edge detector 105 configured to detect a first target edge E1 as an edge of one inspection target film R1 among the films on the basis of the inspection image data stored in the storage 102, by using the first inspection recipe IR1 stored in the storage 102, and configured to detect a second target edge E2 as an edge of another inspection target film R2 among the films on the basis of the inspection image data stored in the storage 102, by using the second inspection recipe IR2 stored in the storage 102. Each of edges E1, E2 of the films R1, R2 extends along the periphery Wd of the substrate W. Each of the first and second inspection recipes IR1, IR2 is configured by combining parameters each of which has one option specified among a plurality of options. A combination of the parameters constituting the first inspection recipe IR1 is different from a combination of the parameters constituting the second inspection recipe IR2. In this case, only the first target edge may be detected on the basis of inspection image data by the first inspection recipe, and only the second target edge may be detected on the basis of the inspection image data by the second inspection recipe. Thus, it is possible to more securely detect each inspection target edge among a plurality of edges, from inspection image data.

Example 16. In the substrate processing apparatus of Example 15, the film forming unit U14, U15 may include a first nozzle 44 that ejects a processing liquid L2 for forming the first target edge E1, and a second nozzle 44 that ejects a processing liquid L2 for forming the second target edge E2. The controller 10 may further include an edge position adjustor configured to adjust a relative position between each of the first and second nozzles 44, 44 and a separate substrate W when the processing liquid L2 is ejected, on the basis of detection results of the first and second target edges E1, E2, such that positions of edges which correspond to the first and second target edges E1, E2 and are included in a plurality of films R1 to R3 to be formed on the separate substrate W in the film forming unit U1, U2 approach target values after the films R1 to R3 including the first and second target edges E1, E2 are formed. In this case, on a substrate to be subsequently processed, an adjustment is also performed so that the positions of the edges corresponding to the first and second target edges are brought close to the target values. That is, it is possible to efficiently perform adjustment of positions of a plurality of edges in the subsequent substrate.

Example 17. A substrate inspection method according to an example of the present disclosure includes generating inspection image data from a captured image of a periphery Wd of a substrate W on which a plurality of films R1 to R3 is formed; and detecting a target edge E1 to E3 as an edge of an inspection target film among the films R1 to R3 on the basis of the inspection image data by using an inspection recipe IR1 to IR3. Each of edges E1 to E3 of the films R1 to R3 extends along the periphery WE of the substrate W. The inspection recipe IR1 to IR3 is configured by combining parameters each of which has one option specified among a plurality of options. In this case, the same action effects as those of Example 1 are obtained.

Example 18. An example of a computer-readable recording medium has recorded therein a program for causing a substrate inspection apparatus to execute the substrate inspection method of Example 17. In this case, the same action effects as those of Example 12 (Example 1) are obtained. In this specification, the computer-readable recording medium includes non-transitory tangible media (a non-transitory computer recording medium) (for example, various main storage devices or auxiliary storage devices) and propagation signals (a transitory computer recording medium) (for example, data signals that may be provided via a network).

According to a substrate inspection apparatus, a substrate processing apparatus, a substrate inspection method, and a computer-readable recording medium according to the present disclosure, it is possible to more securely detect an inspection target edge among a plurality of edges, from image data.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A substrate inspection apparatus comprising:
- a storage configured to store inspection image data obtained from a captured image of a periphery of a substrate on which a film is formed, and an inspection recipe;
- an edge detector configured to detect a target edge as an edge of an inspection target film on the basis of the inspection image data stored in the storage by using the inspection recipe stored in the storage;
- a periphery calculator configured to calculate a position of a theoretical periphery of the substrate; and
- a width calculator configured to calculate a width between the theoretical periphery of the substrate and the target edge on the basis of position data of the theoretical periphery of the substrate obtained by the periphery calculator and position data of the target edge obtained by the edge detector,
- wherein the film continuously extends circumferentially along the periphery of the substrate, and
- the periphery calculator is configured to calculate a position of a theoretical periphery of a reference substrate obtained with respect to a center of the reference substrate, as the position of the theoretical periphery of the substrate.

2. The substrate inspection apparatus according to claim 1, wherein the periphery calculator is configured to execute a process including:
- calculating position data of a reference position preset on the reference substrate on the basis of reference image data obtained from a captured image of a periphery of the reference substrate;
- calculating a difference between a design dimension of a radius of the substrate, and a distance from the center of the reference substrate to the reference position; and
- calculating position data of the theoretical periphery of the reference substrate on the basis of the position data of the reference position and the difference.

3. The substrate inspection apparatus according to claim 1, wherein the periphery calculator is configured to execute a process including:
- calculating position data of the periphery of the substrate on the basis of the inspection image data;
- calculating an eccentric state of the substrate on the basis of the position data of the periphery of the substrate; and
- calculating the position data of the theoretical periphery of the substrate in consideration of the eccentric state of the substrate.

4. The substrate inspection apparatus according to claim 1, wherein the periphery calculator is configured to calculate position data of the periphery of the substrate on the basis of the inspection image data, and
- the width calculator is configured to calculate a width between the periphery of the substrate and the target edge on the basis of the position data of the periphery of the substrate obtained in the periphery calculator, and the position data of the target edge obtained in the edge detector.

5. The substrate inspection apparatus according to claim 1, further comprising:
- an edge position adjustor configured to calculate an adjustment value according to a deviation between the removal width calculated by the determiner and a target value, and adjust a relative position between a nozzle and a separate substrate according the adjustment value.

6. A substrate processing apparatus comprising:
- a film forming processor configured to form a film on a substrate;
- a camera configured to acquire a captured image by imaging a periphery of the substrate; and
- a controller configured to inspect a target edge as an edge of an inspection target film,
- wherein the controller includes:
  - a storage configured to store inspection image data obtained from the captured image, and an inspection recipe;
  - an edge detector configured to detect the target edge on the basis of the inspection image data stored in the storage by using the inspection recipe stored in the storage;

a periphery calculator configured to calculate a position of a theoretical periphery of the substrate; and a width calculator configured to calculate a width between the theoretical periphery of the substrate and the target edge on the basis of position data of the theoretical periphery of the substrate obtained in the periphery calculator and position data of the target edge obtained in the edge detector, wherein the film continuously extends circumferentially along the periphery of the substrate, and the periphery calculator is configured to calculate a position of a theoretical periphery of a reference substrate obtained with respect to a center of the reference substrate, as the position of the theoretical periphery of the substrate.

7. A substrate processing apparatus comprising a film forming processor configured to form a plurality of films on a substrate;

a camera configured to acquire a captured image by imaging a periphery of the substrate; and a controller configured to inspect a target edge as an edge of an inspection target film among the films, wherein the controller includes:

a storage configured to store inspection image data obtained from the captured image, a first inspection recipe, and a second inspection recipe;

an edge detector configured to detect a first target edge as an edge of one inspection target film among the films on the basis of the inspection image data stored in the storage, by using the first inspection recipe stored in the storage, and configured to detect a second target edge as an edge of another inspection target film among the films on the basis of the inspection image data stored in the storage, by using the second inspection recipe stored in the storage;

a periphery calculator configured to calculate a position of a theoretical periphery of the substrate; and a width calculator configured to calculate a width between the theoretical periphery of the substrate and the target edge on the basis of position data of the theoretical periphery of the substrate obtained in the periphery calculator and position data of the target edge obtained in the edge detector, wherein each film continuously extends circumferentially along the periphery of the substrate, the periphery calculator is configured to calculate a position of a theoretical periphery of a reference substrate obtained with respect to a center of the reference substrate, as the position of the theoretical periphery of the substrate, each of the first and second inspection recipes is configured by combining parameters each of which has one option specified among a plurality of options, and a combination of the parameters constituting the first inspection recipe is different from a combination of the parameters constituting the second inspection recipe.

8. The substrate processing apparatus according to claim 7, wherein the film forming processor includes a first nozzle that ejects a processing liquid for forming the first target edge, and a second nozzle that ejects a processing liquid for forming the second target edge, and the controller further includes an edge position adjustor configured to adjust a relative position between each of the first and second nozzles and a separate substrate when the processing liquid is ejected, on the basis of detection results of the first and second target edges, such that positions of edges which correspond to the first and second target edges and are included in a plurality of films to be formed on the separate substrate in the film forming processor approach target values after the films including the first and second target edges are formed.

9. A substrate inspection method comprising:

generating inspection image data from a captured image of a periphery of a substrate on which a film is formed; and detecting, by an edge detector, a target edge as an edge of an inspection target film on the basis of the inspection image data by using an inspection recipe, calculating, by a periphery calculator, a position of a theoretical periphery of the substrate; and calculating a width between the theoretical periphery of the substrate and the target edge on the basis of position data of the theoretical periphery of the substrate obtained in the periphery calculator and position data of the target edge obtained in the edge detector, wherein the film continuously extends circumferentially along the periphery of the substrate, and the periphery calculator is configured to calculate a position of a theoretical periphery of a reference substrate obtained with respect to a center of the reference substrate, as the position of the theoretical periphery of the substrate.

10. A non-transitory computer-readable recording medium having recorded therein a program for causing a substrate inspection apparatus to execute the substrate inspection method according to claim 9.

* * * * *